United States Patent
Golman et al.

(10) Patent No.: US 12,412,561 B2
(45) Date of Patent: *Sep. 9, 2025

(54) REAL TIME CORRECTION OF ACCENT IN SPEECH AUDIO SIGNALS

(71) Applicant: Sanas.ai Inc., Palo Alto, CA (US)

(72) Inventors: Andrei Golman, San Francisco, CA (US); Dmitrii Sadykov, Yerevan (AM)

(73) Assignee: SANAS.AI INC., Palo Alto, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 18/228,023

(22) Filed: Jul. 31, 2023

(65) Prior Publication Data
US 2024/0005907 A1  Jan. 4, 2024

Related U.S. Application Data

(63) Continuation-in-part of application No. 18/083,727, filed on Dec. 19, 2022, now Pat. No. 11,715,457.
(Continued)

(51) Int. Cl.
*G10L 15/00* (2013.01)
*G10L 13/033* (2013.01)
(Continued)

(52) U.S. Cl.
CPC .......... *G10L 15/005* (2013.01); *G10L 13/033* (2013.01); *G10L 15/02* (2013.01);
(Continued)

(58) Field of Classification Search
CPC ......... G10L 15/16; G10L 25/27; G10L 25/30; G10L 15/12; G10L 19/005; G10L 19/00; G10L 19/02; G10L 19/08; G10L 25/90; G10L 13/02; G10L 13/04; G10L 13/06; G10L 21/003; G10L 25/00; G10L 25/75; G10L 13/07; G10L 13/033; G10L 13/08; G10L 13/10; G10L 15/20; G10L 15/07; G10L 15/22; G10L 15/26; G10L 15/30; G10L 15/02; G10L 15/063; G10L 15/08;
(Continued)

(56) References Cited

U.S. PATENT DOCUMENTS

| | | | |
|---|---|---|---|
| 11,150,866 B2 * | 10/2021 | Rand | G10L 15/08 |
| 11,715,457 B1 * | 8/2023 | Golman | G10L 13/04 |
| | | | 704/240 |
| 2004/0207466 A1 * | 10/2004 | Anderson | H03F 3/2175 |
| | | | 330/10 |

* cited by examiner

*Primary Examiner* — Vu B Hang
(74) *Attorney, Agent, or Firm* — Troutman Pepper Locke LLP

(57) ABSTRACT

Systems and methods for real-time correction of an accent in an input audio signal are provided. A method includes extracting acoustic features from a chunk of a stream of chunks of the input audio signal by an acoustic features extraction module of a computational graph; extracting, by a linguistic features extraction module of the computational graph, linguistic features with a reduced accent from the chunk; synthesizing, by a synthesis module of the computational graph, a spectrum representation based on the acoustic features, the linguistic features, and a speaker embedding for a human speaker; and generating, by a vocoder of the computational graph and based on the spectrum representation, an output chunk of an output audio signal. The input audio signal is digitized with a first sample rate and the output audio signal is digitized with a second sample rate.

18 Claims, 14 Drawing Sheets

Related U.S. Application Data

(60) Provisional application No. 63/297,901, filed on Jan. 10, 2022.

(51) Int. Cl.
*G10L 15/02* (2006.01)
*G10L 13/02* (2013.01)
*G10L 13/04* (2013.01)
*G10L 15/22* (2006.01)

(52) U.S. Cl.
CPC .............. *G10L 13/02* (2013.01); *G10L 13/04* (2013.01); *G10L 15/22* (2013.01)

(58) Field of Classification Search
CPC ..... G10L 25/87; G10L 15/14; G10L 15/1815; G10L 15/197; G10L 2015/025
See application file for complete search history.

REAL TIME CORRECTION OF ACCENT IN SPEECH AUDIO SIGNALS

CROSS-REFERENCE TO RELATED APPLICATIONS

The present application is a Continuation-in-Part of U.S. application Ser. No. 18/083,727 filed on Dec. 19, 2022, and entitled "Real Time Correction of Accent in Speech Audio Signals," which in turn claims priority of U.S. Provisional Patent Application No. 63/297,901 filed on Jan. 10, 2022, entitled "Real Time Correction of Accent in Speech Audio Signals." The subject matter of the aforementioned applications is incorporated herein by reference in its entirety for all purposes.

TECHNICAL FIELD

This disclosure generally relates to audio processing. More particularly, this disclosure relates to systems and methods for real-time correction of accent in input audio signals.

BACKGROUND

Audio communications, such as audio chats, audio and video calls, and audio and video meetings are very popular in various applications. However, audio communications can be complicated by the fact that speakers possess strong accents that are difficult to understand for other participants. Existing solutions for correcting accents in audio signals are not very effective in real-time communications.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for real-time correction of an accent in an input audio signal is provided. The method can be implemented by a computing system. The method may include extracting acoustic features from a chunk of a stream of chunks of the input audio signal by an acoustic features extraction module of a computational graph. The method may include extracting linguistic features with a reduced accent from the chunk by a linguistic features extraction module of the computational graph. The method may include synthesizing, by a synthesis module of the computational graph, a spectrum representation based on the acoustic features, the linguistic features, and a speaker embedding for a human speaker. The method may include generating, by a vocoder of the computational graph and based on the spectrum representation, an output chunk of an output audio signal. Each node (module) in the computational graph can be associated with its own set of inputs (input features) and can compute a set of outputs (output features) depending on the inputs. The spectrum representation can be an example of an input feature or an output feature.

The spectrum representation may include a melspectrogram with the reduced accent. The acoustic features may include one or more of the following: a pitch of the input audio signal, a standard deviation of the pitch of the input audio signal, a mean of the pitch of the input audio signal, an energy of the input audio signal, a noise floor of the input audio signal, Linear Prediction Cepstral Coefficient (LPCC) of the input audio signal, Mel Frequency Cepstral Coefficient (MFCC) of the input audio signal, and Bark frequency Cepstral coefficient (BFCC) of the input audio signal.

The input audio signal is digitized with a first sample rate and the output audio signal is digitized with a second sample rate. The second sample rate can be different from the first sample rate. Input data of the first module of the computational graph may have a first sample rate and output data of a second module preceding the first module in the computational graph may have a second sample rate different from the first sample rate. The method may include resampling the output data from the second sample rate to the first sample rate and providing the resampled output data and at least one characteristic of the resampled output data to the first module as the input data.

The computing system includes at least two processing units, and at least two modules from the computational graph are processed in parallel using the at least two processing units. The method may include providing, as an input to at least one module in the computational graph, a time-shift parameter indicating a difference in timestamps of the chunk of a stream of chunks of the input audio signal and one of the following: input data or output data of the at least one module. The method may include assigning a further time-shift parameter to output data of at least one module. The further time-shift parameter may include the time-shift parameter and internal delay of processing the input data by at least one module. The method may include providing the further time-shift parameter and the output data as a further input to a further module succeeding the at least one module in the computational graph. The acoustic features are assigned a lower time-shift parameter than the linguistic features.

According to another embodiment, a system for real-time correction of an accent in an input audio signal is provided. The system may include a computational graph including an acoustic features extraction module, a linguistic features extraction module, a synthesis module, and a vocoder. The acoustic features extraction module can be configured to extract acoustic features from a chunk of a stream of chunks of the input audio signal. The linguistic features extraction module can be configured to extract, from the chunk, linguistic features with a reduced accent. The synthesis module can be configured to synthesize a spectrum representation based on the acoustic features, the linguistic features, and a speaker embedding for a human speaker. The vocoder can be configured to generate, based on the spectrum representation, an output chunk of an output audio signal.

According to yet another aspect of the disclosure, there is provided a non-transitory processor-readable medium, which stores processor-readable instructions. When the processor-readable instructions are executed by a processor, they cause the processor to implement the above-mentioned method for real-time correction of an accent in an input audio signal.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
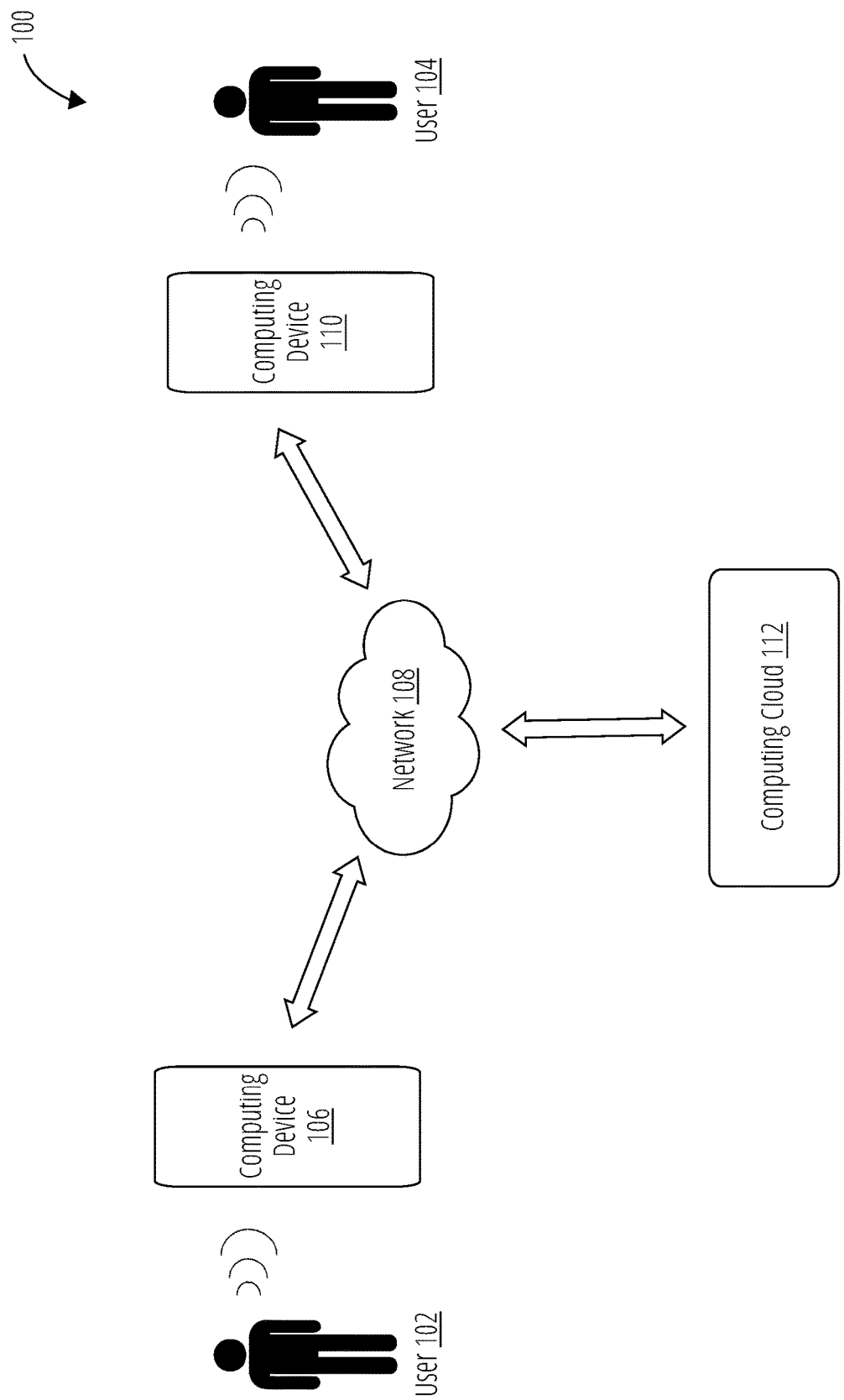
FIG. 1 shows an example environment, where a method for real-time correction of accent in input audio signals can be practiced.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure relates to methods and systems for real-time correction of accent in input audio signals. Some embodiments of the present disclosure may be implemented in audio and video conversations to remove an accent in an input audio signal captured from of a speaker uttering speech in a language that is not native to the speaker or a dialect of the same language that is different from the dialect spoken by other participants. Specifically, the input audio signal can be analyzed in real time in chunks to extract acoustic features and linguistic features. The acoustic features and linguistic features can then be used to synthesize a spectrum representation lacking the accent of the speaker. The spectrum representation can be used by a vocoder to generate an output audio signal lacking the accent.

The method for real-time correction could be represented as a computational graph (pipeline) including computational blocks (modules or nodes). Each of the blocks can be implemented via neural models, signal transforms, and the like. Transformation of input signal to output signal may involve computing every block in such computational graph. Computation of blocks may not be limited to a single processor. In various embodiments, different parts of a computational graph can be performed on Graphics Processing Units (GPUs), Neural Processing Units (NPUs), Field Programmable Gate Arrays (FPGAs), and central processing units (CPUs). Data flowing in a computational graph can be transferred from memory of processors of one type to memory of processors of other types using data transportation means when required for computing. Computing of the computational graph may or may not be parallelized using multi-threaded environments or frameworks.

Order of the computing nodes can be based on dependency of inputs of each node from preceding nodes. If the output of the first node in the computational graph is used as input of the second node in the computing graph, then such nodes are referred to as adjacent nodes, the first node is referred to as a preceding node and the second node is referred to as a succeeding node. A node of the computational graph can start computing only when all required input features have been already computed by preceding nodes. The computation for a set of nodes can be performed in parallel if inputs of any node from a set do not depend on outputs of any other node from this set.

Input data of the first module of the computational graph may require input with defined sample rate (also referred to as a frame rate, which is a number of frames per second) and corresponding output data of the second module preceding the first module in the computational graph may have a second sample rate different from the first sample rate. Accordingly, the output data can be resampled to the defined sample rate and the resampled output data can be provided to the first module as input data.

In contrast to the existing solutions, embodiments of the present disclosure allow to reduce the delay between recording a chunk of the speech acoustic signal and outputting the corresponding chunk of the output audio signal to 40-300 milliseconds.

An example environment 100 is where a method for real-time correction of accent in input audio signals can be practiced. It should be noted, however, that the environment 100 is just one example and is a simplified embodiment provided for illustrative purposes, and reasonable deviations of this embodiment are possible as will be evident to those skilled in the art.

As shown in FIG. 1, environment 100 may include a user 102, a user 104, a computing device 106, a computing device 110, a network 108, and a cloud-based computing resource 112 (also referred to as a computing cloud 112).

The computing device 106 and computing device 110 each may include a sound sensor, memory, processor, communication unit, and output device. The memory may be configured to store processor-readable (machine-readable) instructions or codes, which when performed by the processor, cause the computing device 106 (or computing device 110) to perform at least some steps of methods for real-time correction of accent in input audio signals as described herein. The processor may perform floating point operations, complex operations, and other operations, including performing speech recognition and analysis based on ambient acoustic signals captured by sound sensor(s). The processors may include general purpose processors, video processors, audio processing systems, CPUs, GPUs, and so forth. The sound sensor(s) can include one or more microphones. The sound sensor(s) can be spaced a distance apart to allow the processor to perform a noise and/or echo reduction in received acoustic signals. The output device(s) may comprise one or more speaker(s), an earpiece of a headset, or a handset.

In various embodiments, the computing device 106 and computing device 110 can be configured to communicate with a network 108 such as the Internet, wide area network (WAN), local area network (LAN), cellular network, and so forth, to receive and send audio data.

The computing device 106 and computing device 110 can refer to a mobile device such as a mobile phone, smartphone, or tablet computer, a personal computer, laptop computer, netbook, set top box, television device, multimedia device, personal digital assistant, game console, entertainment system, infotainment system, vehicle computer, or any other computing device. The computing device 106 can be communicatively connected to the computing device 110 and the computing cloud 112 via network 108.

The network 108 can include any wired, wireless, or optical networks including, for example, the Internet, intranet, LAN, Personal Area Network (PAN), WAN, Virtual Private Network (VPN), cellular phone networks (e.g., Global System for Mobile (GSM) communications network, packet switching communications network, circuit switching communications network), Bluetooth™ radio, Ethernet network, an IEEE 602.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, network 108 may include a corporate network, data center network, service provider network, mobile operator network, or any combinations thereof.

Computing cloud 112 can be shared by multiple users and be dynamically reallocated based on demand. Computing cloud 112 can include one or more server farms and clusters including a collection of computer servers that can be co-located with network switches or routers.

According to one example embodiment, user 102 may communicate with user 104 through a voice call using a messenger or send voice messages via the messenger. The voice of user 102 can be captured by the sound sensor of the computing device 106 to generate an input audio signal. The user 102 may not be a native speaker of the language the user 102 speaks, so the input audio signal may include an accent of the user 102. The input audio signal can be further modified to remove or reduce the accent of the user 102 in the input audio signal.

In one embodiment, the modification of the input audio signal can be carried out by a processor of computing device 106. The modified input audio signal can be sent, via the communication unit of the computing device 106, to the computing device 110. The computing device 110 may play back the modified input audio signal via output device(s). Thus, user 104 may listen to the modified input audio signal instead of the speech of the user 102.

In other embodiments, the input audio signal can be sent to the computing cloud 112. In some embodiments, the input audio signal can be sent to the computing cloud 112 using voice over internet protocol (VoIP). Computing cloud 112 can modify the input audio signal to remove or correct the accent of the user 102 from the input audio signal. Computing cloud 112 can send the modified input audio signal to the computing device 110.

Figure 2:
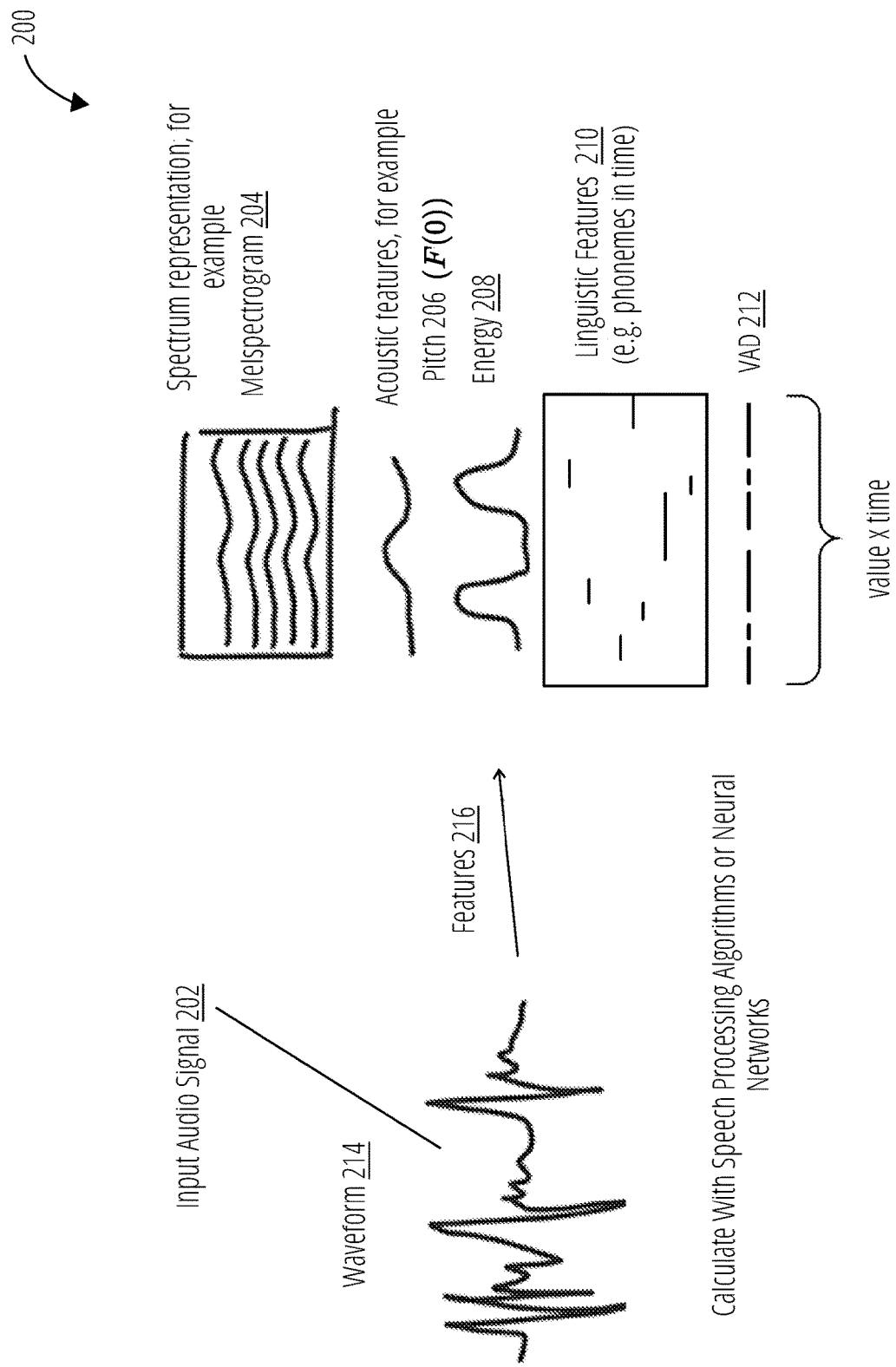
FIG. 2 is a schematic showing features that can be extracted from an input audio signal, according to some example embodiments of the present disclosure.

FIG. 2 is a schematic showing features 216 that can be extracted from an input audio signal 202, according to some example embodiments of the present disclosure. The input audio signal 202 may include waveforms 214. The features 216 can be calculated per each time frame x. The features 216 may include acoustic features and linguistic features 210. The acoustic features may include pitch 206 (or main frequency (F0)), energy 208 (signal amplitude), and voice activity detection (VAD) 212. VAD 212 is a flag indicating the presence or absence of voice in the time frame. In some embodiments, the acoustic features may also include a standard deviation of the pitch of the input audio signal, a mean of the pitch of the input audio signal, an energy of the input audio signal, a mean of the energy of the input audio signal, a noise floor of the input audio signal, a standard deviation of the energy of the input audio signal, and the like. In certain embodiments, the acoustic features may include LPCC of the input audio signal, MFCC of the input audio signal, and BFCC of the input audio signal, and custom linear transform of Short-time Fourier transform (STFT) values of audio signal.

Each of the features 216 is aligned with the others in time. Values of each feature are equidistant in time with respect to the values of the same feature obtained from the neighboring time frames. Accordingly, each of the features 216 is obtained from a chunk of input audio signal 202 corresponding to an equal time period.

The spectrum representation, for example melspectrogram 210, can be generated based on the acoustic features and linguistic features 210 as described herein. In other embodiments, spectrum representation may include LPCCs and BFCCs.

Figure 3:
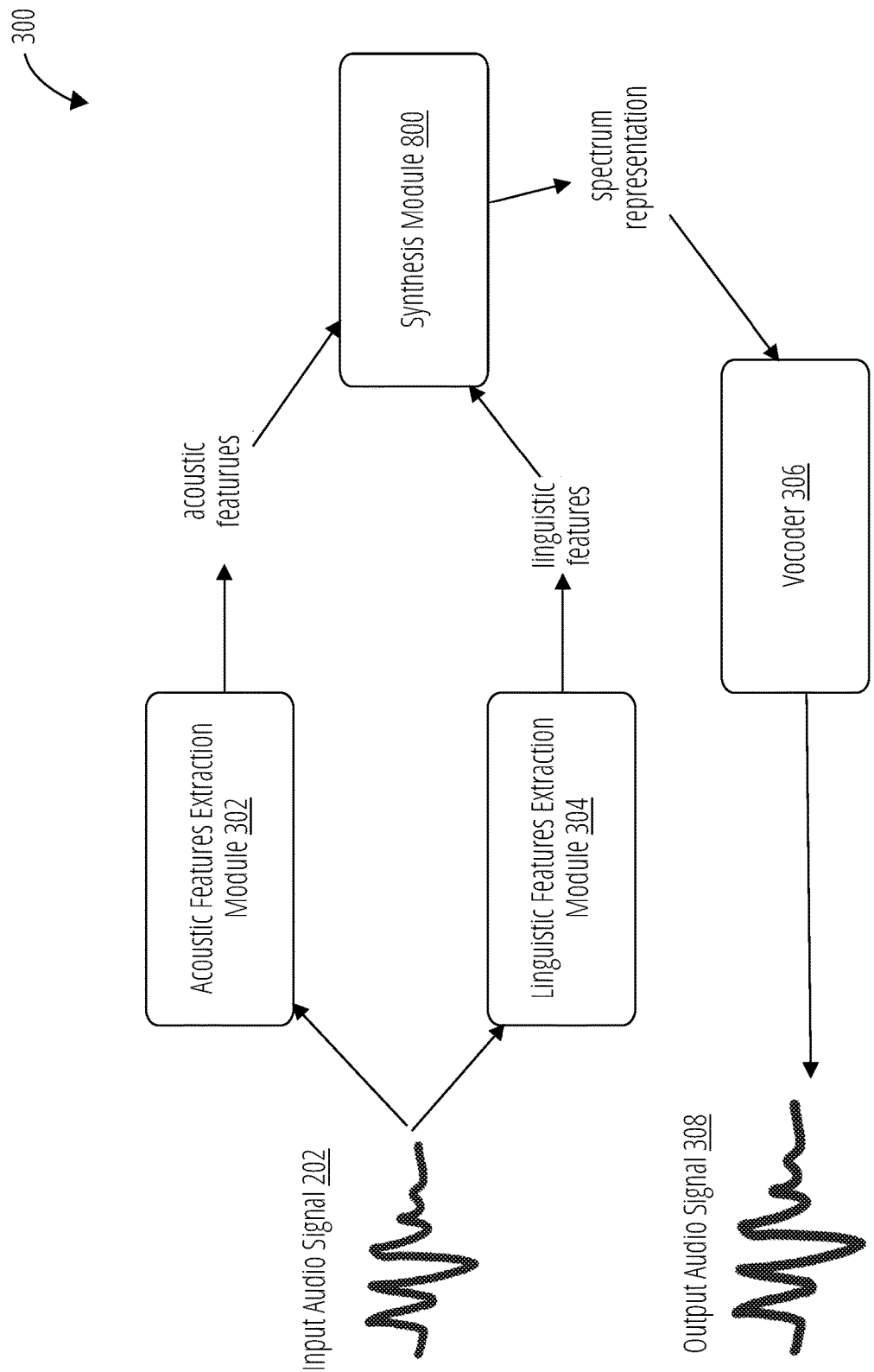
FIG. 3 is a block diagram showing a pipeline for real-time correction of an accent in input audio signals, according to an example embodiment.

FIG. 3 is a block diagram showing a pipeline 300 for real-time correction of an accent in input audio signals, according to an example embodiment. The pipeline 300 (also referred to as a computational graph) may include an acoustic features extraction module 302, a linguistic features extraction module 304, a synthesis module 800, and a vocoder 306.

The acoustic features extraction module 302 may extract, from a time frame of the input audio signal 202, the acoustic features including pitch 206 (F0), energy 208, and VAD 212. These acoustic features can be obtained by algorithmic methods for signal processing or neural networks.

The linguistic features extraction module 304 may extract, from a time frame of the input audio signal 202, linguistic features 210. In some embodiments, linguistic features 210 may include hidden features of an Automatic Speech Recognition (ASR) neural network with additional custom training and transformations or phonemes belonging to a phoneme set for a predetermined language. For example, the phoneme set may include ARPAbet phoneme set for English or classes (called pseudo-labels) of some clusterization algorithm over linguistic acoustic features of English speech data, like mel-spectrogram or hidden features of the ASR neural network. The phonemes can be obtained by a neural network trained to recognize and classify phonemes. In certain embodiments, the linguistic features 210 can be represented as Phonetic PosteriorGrams (PPGs). PPG can be defined as a distribution of the posterior probabilities of each phonetic class for each specific time frame of the input audio signal 202. Even though embodiments of the present disclosure are described as utilizing PPGs, the present technology can be practiced with any linguistic features. For example, linguistic features 210 may include bottleneck outputs (bottleneck features) of an ASR neural network. The bottleneck outputs can be calculated from previous internal layer(s) of the ASR neural network. Typically, the bottleneck features of the ASR neural network can be represented as multidimensional vectors, for example 256 values per frame.

The acoustic features and linguistic features can be provided to the synthesis module 800. The synthesis module 800 may generate a spectrum representation, for example melspectrogram 204, corresponding to speech of the user 102 with removed or reduced accent. The spectrum representation (melspectrogram 204) can be provided to the vocoder 306. The vocoder 306 may generate output audio signal 308.

In some embodiments, the computational graph can be implemented on a single CPU-based computational system. In other embodiments, the different nodes of a computational graph (pipeline 300) can be implemented using computing systems including different computational nodes, such as GPU-based nodes, CPU-based nodes, NPUs, and FPGAs.

In one example embodiment, acoustic features extraction module 302, linguistic features extraction module 304, and synthesis module 800 can be implemented on GPU-based computational nodes. Then spectrum representation (melspectrogram 204) can be transferred on a CPU-based computational node that implements vocoder 306. In these embodiments, extraction of acoustic features and linguistic features can be parallelized. Computing of some acoustic feature extraction nodes and linguistic feature extraction nodes may be parallelized because inputs of the acoustic feature extraction nodes and the linguistic feature extraction nodes do not depend on output features of each other.

In another example embodiment, acoustic features extraction module 302 and linguistic features extraction module 304 can be implemented on CPU-based computational nodes. Then acoustic features and linguistic features can be transferred to GPU-based computational nodes that implement synthesis module 800 and vocoder 306. In these embodiments, extraction of acoustic features and linguistic features can be parallelized.

In yet another embodiment, modules 302, 304, 800, and 306 each can be implemented on CPU-based computational nodes. In these embodiments, extraction of acoustic features and linguistic features can be parallelized.

It should be noted that in some embodiments, modules 302, 304, 800 can be implemented as neural networks. In these embodiments, in addition to performing parallel computation of acoustic features and linguistic features, computation of internal blocks of the neural networks can be also viewed as different computational nodes and performed in parallel on multiple processing units if the structures of the neural networks allow to do so.

In general, GPU-based computational nodes can be used if modules 302, 304, 800, and 306 are neural network-based modules. If any of the modules 302, 304, 800, and 306 are not implemented as a neural network, such a module can be implemented on CPU-based computational nodes. However, if vocoder 306 is a Linear predictive coding network (LPCNet) vocoder, the vocoder 306 can be implemented on a CPU-based computational node.

Figure 4:
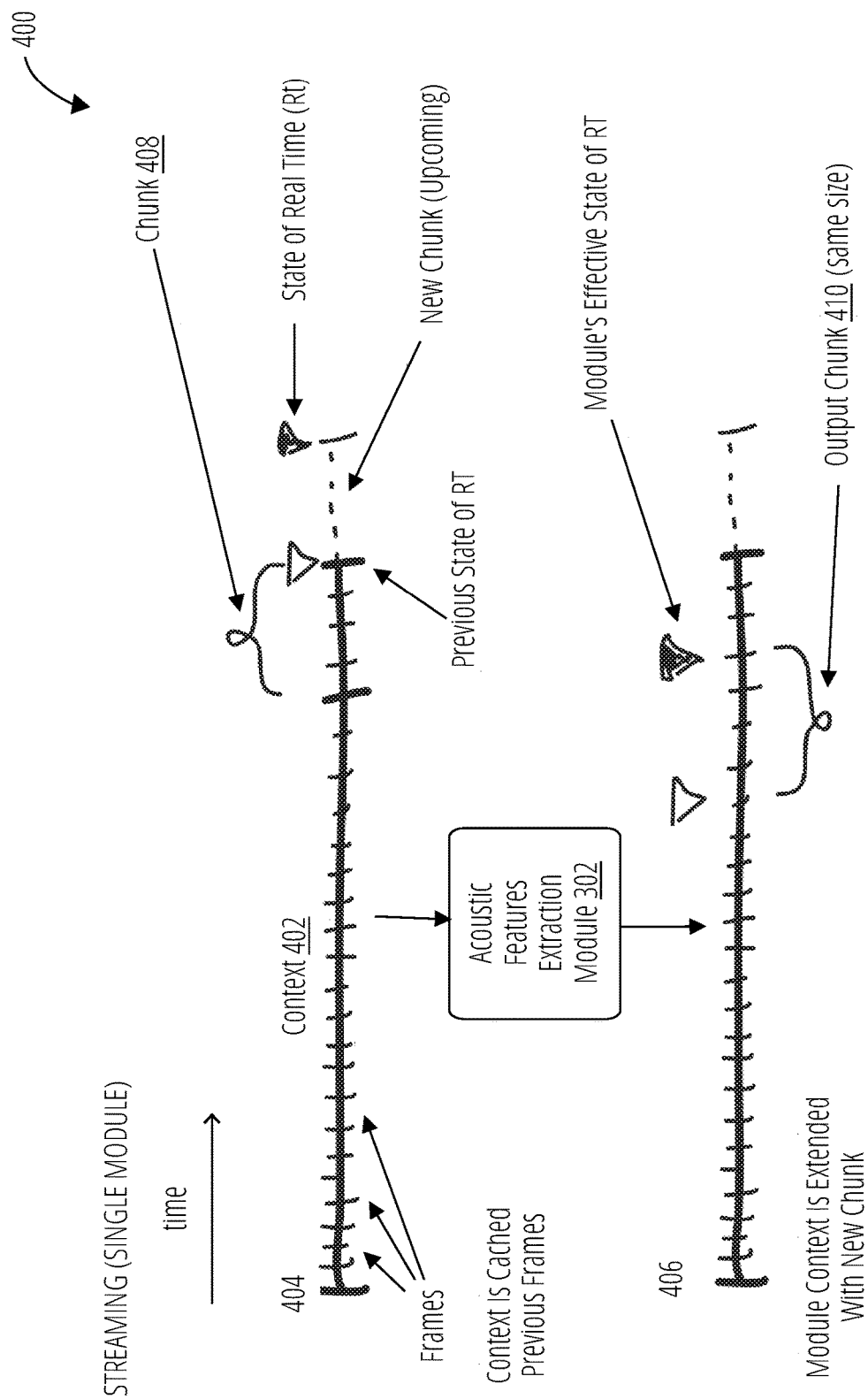
FIG. 4 is a schematic showing details of dividing an input audio signal into chunks for forming input data to modules of the pipeline, according to an example embodiment.

FIG. 4 is a schematic 400 showing details of dividing an input audio signal 202 into chunks for forming input data to modules of the pipeline 300. The input audio signal 202 can be provided to the modules (for example, acoustic features extraction module 302) as a stream 404 of chunks. Each chunk may include a predetermined number of frames. Each of the frames is a portion of the input audio signal 202 of a predetermined time interval size. In some embodiments, the length of each of the frame can be, for example, 11.6 milliseconds (ms).

An input to module 302 may include a chunk 408 of frames concatenated with a context 402. The context 402 may include a pre-determined number of frames of the input audio signal 202 preceding the chunk 408. Context 402 can be stored in a cache of module 302 and continuously updated. Thus, at each state of real time, input of the modules can include the chunk 408 ended at the previous state of real time and the context 402 corresponding to the chunk.

The output of module 302 is stream 404. The stream 404 may include chunks of one of acoustic features (pitch 206 (F0), energy 208, or VAD 212). Output chunk 410 can be formed by cutting, from an output stream 406, a chunk that ends at an effective state of real time in module 302. The context 402 can be extended by chunk 408. The first chunk in the context 402 can be removed. Thus, the modified context 402 can be used for processing the next chunk from the stream 404. The output chunk 410 can be provided to the synthesis module 800 (shown in FIG. 3). Similarly, module 304 (shown in FIG. 3) may produce a stream of chunks of linguistic features. The chunks of linguistic features can also be provided to the synthesis module 800.

Overall, input of the synthesis module 800 includes a stream of chunks of linguistic features 225 (PPGs), a stream of chunks of values of pitch 206 (F0), a stream of chunks of values of energy 208, and a stream of chunks of values of VAD 212, all the streams being aligned with each other. The output of the synthesis module 800 module and, correspondingly, the input of the vocoder 306, includes a stream of chunks of melspectrogram 204. Similar to module 302, each of the modules 304, 800, and 306 may have a cache to store a context including a predetermined number of previous frames of the corresponding features. The above architecture of streaming chunks to every one of modules 302, 304, 800, and 306 can be applied recursively to internal submodules of these modules, such as neural network blocks and layers.

In further embodiments, the context can be also cached for submodules of the modules 302, 304, 800, and 306. For example, acoustic features extraction module 302 may include one or more of the following submodules: 1D convolution layer (Conv1d), attention layer, and variance predictors. Each of the submodules may include cache for storing the context of output of corresponding preceding submodule in the acoustic features extraction module 302. The preceding submodule may output a stream of chunks of internal features corresponding to stream 404. The input to the next submodule in module 302 may include the last output chunk produced by the preceding submodule and the context including a predetermined number of previous frames of chunks produced by the preceding submodule.

Caching context for inner submodules of modules 302, 304, 800, and 306 (outer modules) may allow to achieve same output quality for modules 302, 304, 800, and 306 between training stage and streaming (inference) stage because a future context of an outer module originates from future contexts of inner submodules. Every layer in sequential part of a neural network that implements one of the modules 302, 304, 800, and 306 can be part of the future context. The parts of the future context can be summed up to receive a total future context of the outer module. The total future context of the outer module can be split into the outer part (regulated with cache of the outer module) and inner part (regulated with inner submodules' caches). In some embodiments, only inner future context can be used in streaming. In other embodiments, partially inner further context and partially outer future context can be used in streaming.

Figure 5:
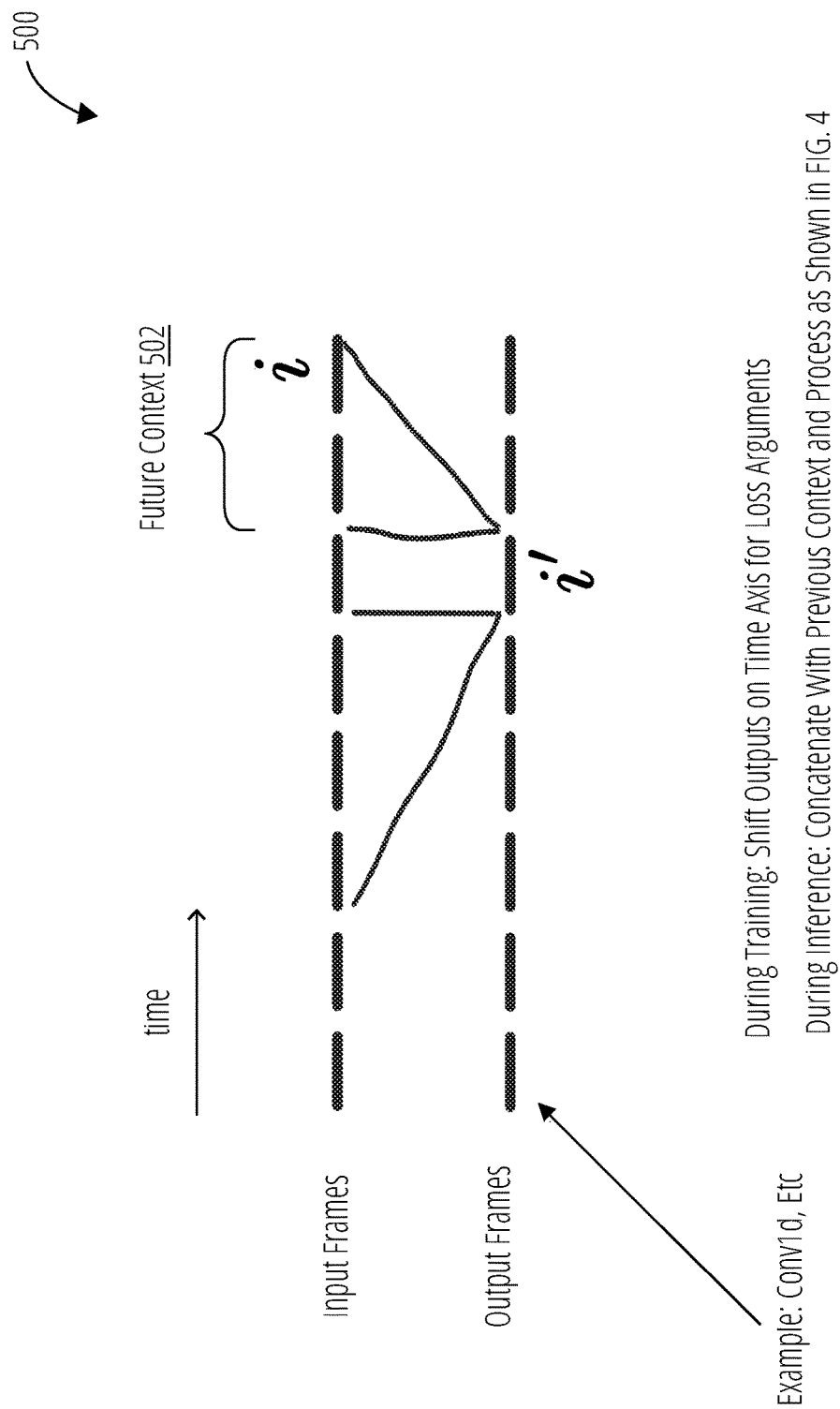
FIG. 5 is a schematic showing details of processing input frames during a training stage of submodules and modules of the pipeline, according to an example embodiment.

FIG. 5 is a schematic 500 showing details of processing input frames during the training stage of submodules and modules of the pipeline 300, according to an example embedment. FIG. 5 shows input frames and output frames for a minimal example of a neural network layer, which produces output shifted on the time axis parametrized by future context (also referred to as a shift). For example, the neural network layer may include conv1d, attention layer, conformer, and other layers. During training, the output frames can be shifted for calculation of Loss sensitive to time location, which can teach the model (layer) to produce shifted output by the parameter of the future context. On inference stage (streaming), the input frames j can be concatenated with previous context, divided in chucks, and processed as described in FIG. 4.

Figure 6:
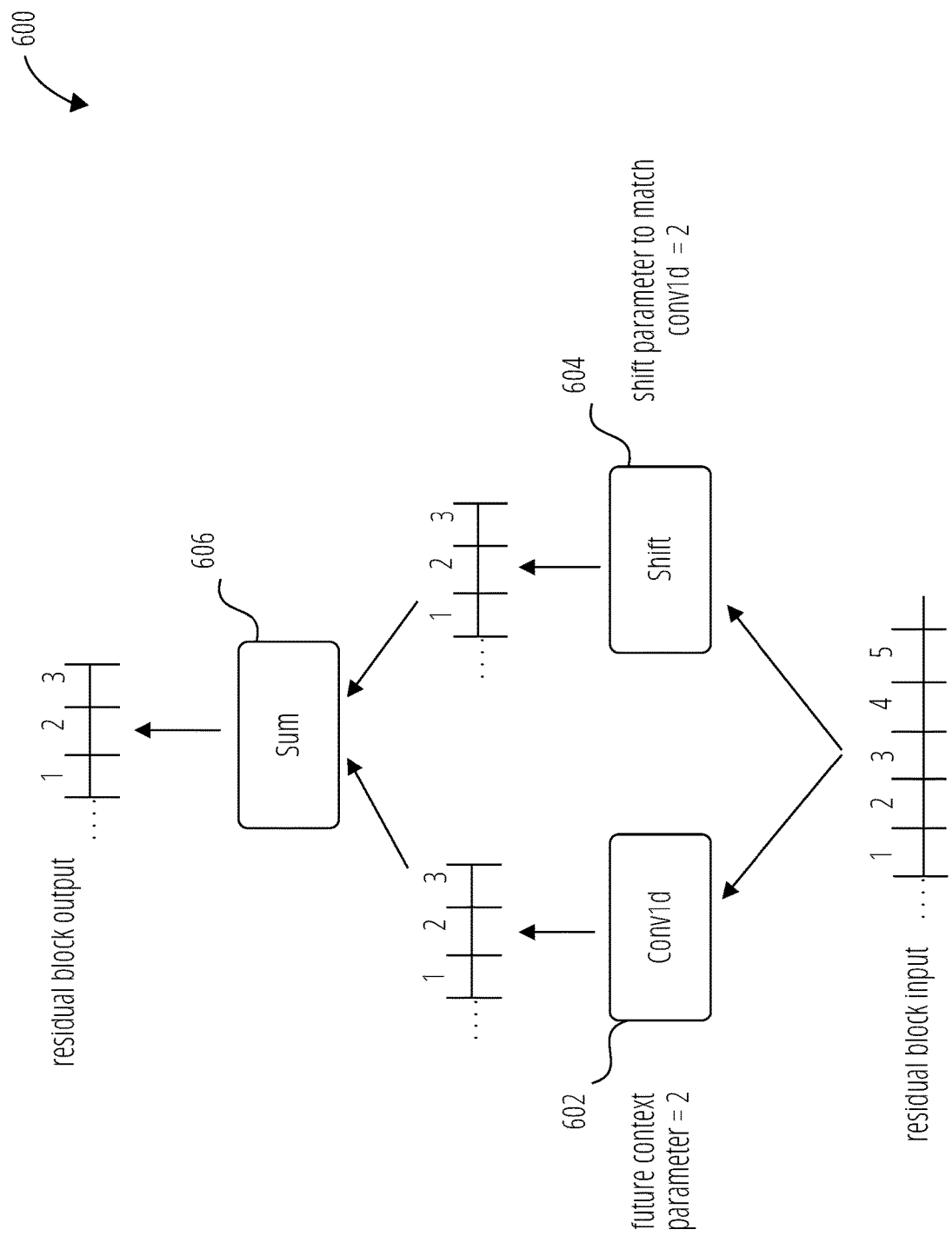
FIG. 6 is a schematic showing details of summation of a context in an example module 600, according to an example embodiment.

FIG. 6 is a schematic showing details of summation of a context in an example module 600, according to an example embedment. The module 600 may include parallel blocks, Conv1D 602 and Shift 604. The Conv1D 602 may use input frames 1, 2, 3 as context for input frames 4 and 5. To obtain the total future context for module 600, the input frames 1, 2, 3, 4, 5 can be shifted by shift 604 by 2 frames and summed with context output from the Conv1D 602 in block 606.

In some embodiments, the future context can be determined as a maximum of sums of context in any sequential path within the module, submodule, or neural network. For example, the residual block module has a residual connection of a convolution layer with two sequential operations, where the first operation is convolution with future context x, and the second operation is residual summation of inputs to convolution layer to output. There are two sequential paths from inputs to outputs in such a module, the first path: inputs→conv→add→output, and the second path: inputs→add→output. If the sequential path with the maximum sum of future contexts is the first path, then the total future context equals x. In these embodiments, correctness (i.e., requirement of producing the same result as achieved for a trained system) for a computational graph is proved if the future contexts of any sequential path of the computational graph, where edges oriented from inputs to outputs, are equal to the same value.

Technical Details

1) In some embodiments, the input audio signal 202 can include a continuous stream of 16-bit samples with a frequency of 22050 kHz. The input audio signal 202 can be split into overlapping windows with a step of 256 samples (~11.6 ms). Accordingly, one frame corresponds to 256 samples.

The acoustic features and linguistic features can be extracted and calculated such that the centers of the windows that correspond to each feature coincide. Thus, the centers can point to the same moment in time to satisfy the condition of alignment of the features. Accordingly, when the synthesis module 800 processes the input, the number of frames from each feature is the same. The number of frames in the output melspectrogram 204 may also coincide with the number of frames from each feature. Consequently, the number of samples of the input audio signal 202 (input signal) can be equal to the number of samples of output audio signal 308.

Figure 7:
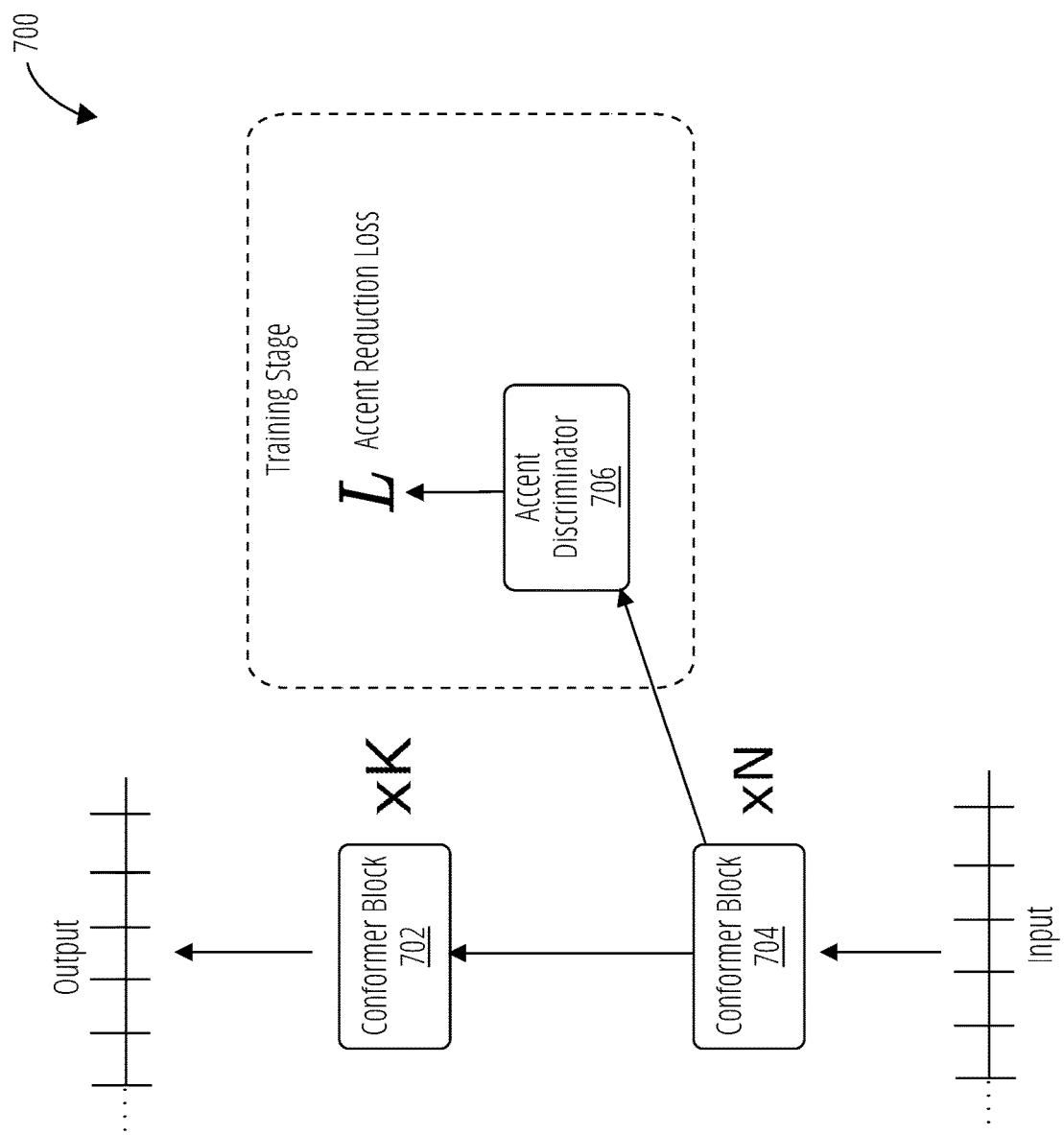
FIG. 7 shows a part of an example neural network trained to generate linguistic accent-agnostic features, according to an example embedment.

2) FIG. 7 shows a part of an example neural network 700 trained to generate accent-agnostic PPGs. The neural network 700 may include N Conformer blocks 704 and K Conformer blocks 702. The Conformer is a convolution-augmented transformer for speech recognition. Each of the Conformer blocks can be implemented with restrictions on attention and the convolutional layer on visible future frames and previous frames. A neural network 700 trained to generate PPGs may also include a linear head for predicting phonemes.

The neural network 700 can be trained using an accent discriminator 706 and supervised information for accent. During training, an additional feed-forward network (FFN) can be used between transformer blocks of neural network 700. Output features from the FFN and supervised label on accent can be utilized for additional accent reduction loss L. Training with the additional accent reduction loss may reduce leak of accent through the recognition model. In example of FIG. 7, output of the Nth Conformer block 704 can be utilized to produce additional features by a simple FFN (for example, linear-Rectified Linear Unit (ReLU)-linear). These features can be utilized for accent reduction loss based on data labels indicating which accent is used on every utterance. Use of the accent reduction loss during training may help to produce accent-agnostic features. "Cross-entropy classification loss with reversal gradients module" for the accent reduction loss.

During inference, an output (target) accent can be selected from accents available on a training stage. During the training stage, datasets of different voices and accents can be used. Any of the datasets can be validated for appropriate sound quality and then used for output target voice and accent.

3) Extraction of acoustic features (pitch 206 (F0), energy 208, or VAD 212, mean pitch, standard deviation of pitch, and so forth) can be performed by algorithmic methods using sound processing tools or by trained neural networks. The following algorithmic methods and utilities may be applied:

Energy 208: STFT followed by a summation over all frequency bins and applying a logarithm to the result of the summation.

Pitch 206 (F0) and VAD 212: values of F0 and voiced/unvoiced intervals can be obtained using the pyWORLD script. pyWORLD is a free software for high-quality speech analysis, manipulation, and synthesis. The pyWORLD can estimate fundamental frequency (F0), aperiodicity, and spectral envelope. The values of F0 can be interpolated to unvoiced intervals. Then, the logarithm can be applied to resulting F0.

Energy 208 and Pitch 206 (F0) can also be normalized globally using an average variance of corresponding values obtained from voice signals recorded from multiple speakers.

Figure 8:
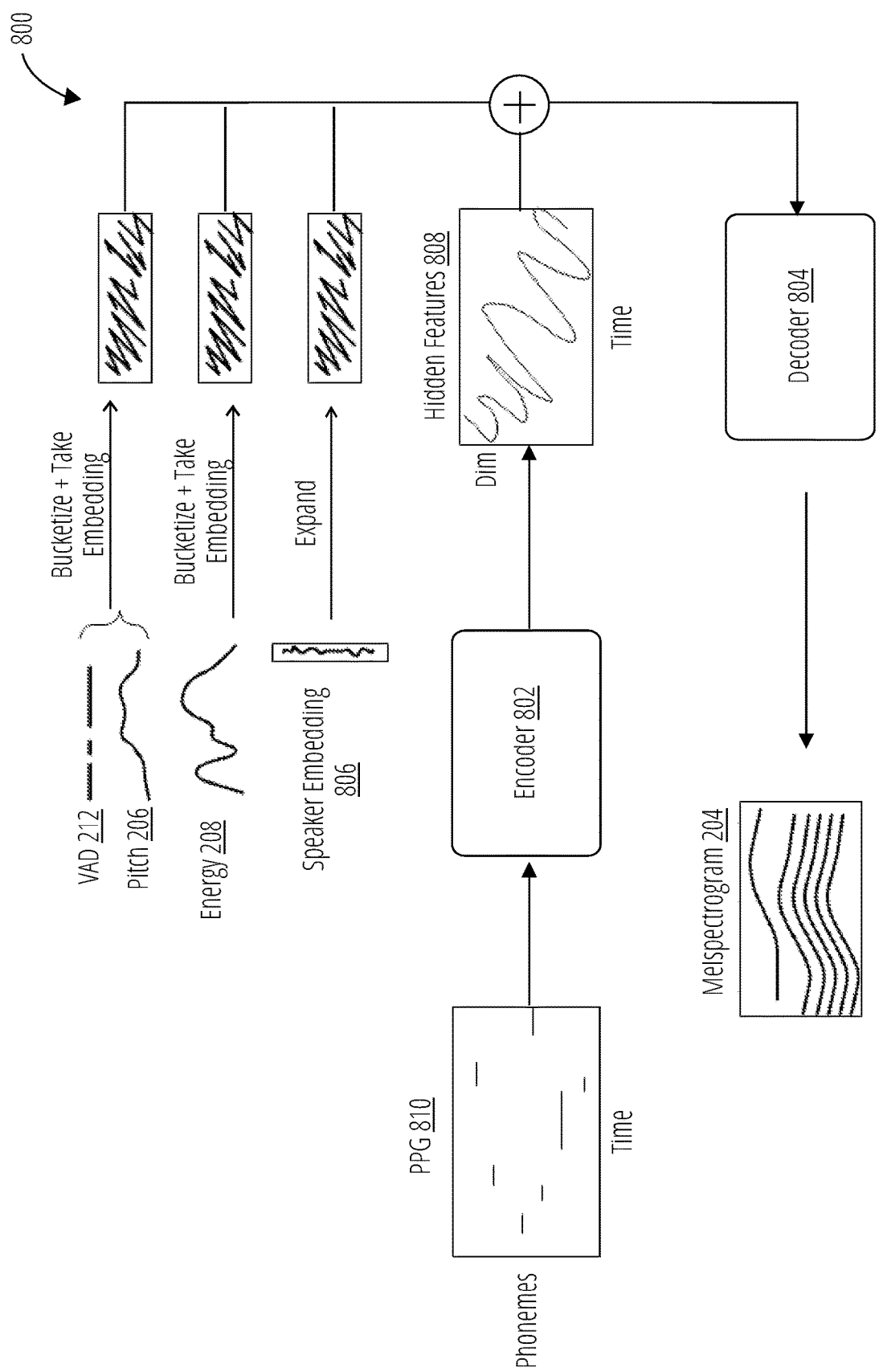
FIG. 8 is a block diagram showing blocks of a synthesis module, according to an example embodiment.

FIG. 8 is a block diagram showing blocks of the synthesis module 800, according to an example embodiment. The synthesis module 800 may include an encoder 802 and decoder 804. In some embodiments, encoder 802 and decoder 804 can be implemented as neural networks. Specifically, both encoder 802 and decoder 804 can be based on lightweight convolution blocks. A convolutional layer (Conv1d-Groupnorm-GELU) acting as relative positional embedding can be applied to input of the encoder 802. In some embodiments, relative positional embedding is added to the input inside the encoder 802. A further convolutional layer (Conv1d-Groupnorm-GELU) acting as further relative positional embedding can be applied to input of the decoder 804. In some embodiments, the further relative positional embedding is added to the input of the decoder 804.

The input of the encoder 802 are linguistic features 210. The output of the encoder 802 has hidden features 808. The speaker embedding 806 of a target speaker and embeddings of the discretized values of energy 208 and pitch 206 (f0) are further added to the output of the encoder 802 to form input for the decoder 804. If VAD 212=False, a separate embedding is used instead of embedding of pitch 206 (F0). Speaker embedding 806 can be a calculated feature in the form of a dense multi-dimensional vector. Speaker embeddings 806 may include necessary information on target speakers' voice style not related to the accent of the target speaker.

In various embodiments, speaker embedding 806 can be trained fixed, pre-trained fixed, or extracted via a pre-trained model from input audio signal 202 in real-time. For example, the speaker embedding 806 can be trained or extracted using pre-trained algorithms in such a way that the voice acoustic features corresponding to the speaker embedding 806 match voice acoustic features of the target speaker. In these embodiments, the speaker embedding 806 can be pretrained based on audio data including recorded speech of the target speaker. User 102 may be provided with an option to select speaker embedding 806 from a list of pretrained speaker embeddings corresponding to different speakers.

In other embodiments, the voice speaker embedding 806 can be generated in real-time based on input audio signal 202 being recorded from the voice of the user 102. In these embodiments, a caching scheme similar to the caching scheme described in FIG. 4 can be used to extract the speaker embedding 806 from input audio signal 202 in real-time. The speaker embedding 806 can be used later to produce output audio signal 308 having voice acoustic features of the user 102.

In yet other embodiments, the speaker embedding 806 can be pre-generated based on previously recorded speech signals of the user 102 and stored in memory of the computing device 106 or computing cloud 112. In these embodiments, the speaker embedding 806 can be retrieved from the memory computing device 106 or computing cloud 112 to avoid recomputing the speaker embedding 806 in real-time.

The output of decoder 804 is melspectrogram 210. The values of VAD 212, Energy 208, and pitch 206 can be the same as acoustic features extracted by acoustic features extraction module 302 (shown in FIG. 3) or predicted by separate modules of the synthesis module 800. All blocks of encoder 802 and decoder 804, as well as predictors and the relative positional encoding layer, can be implemented with a limited future context.

The melspectrogram 210 is provided to vocoder 306. In some embodiments, the vocoder 306 can correspond to the HiFi-GAN v2 or LPCNet vocoder without changes. The vocoder parameters may correspond to the synthesis of the audio signal for the frames of the melspectrogram.

In some embodiments, synthesis module 800 may be configured to use acoustic features and linguistic features and output different features than those described in FIG. 8. For example, features used by synthesis module 800 can include spectrogram, melspectrogram, MFCC, BFCC, energy, pitch F0, mean pitch F0, standard deviation of pitch F0, Voice Activity Detection, noise floor, and other features. Accordingly, synthesis module 800 may have a different neural block structure and different structures of encoder and decoder from those described in FIG. 8. In various embodiments, neural blocks can be CNN blocks, transformer blocks, conformer blocks, light-convolution blocks, normalizing flow invertible blocks with condition, diffusion blocks with condition, and others. Encoder and decoder structure may have different positional encoding, number of blocks, block types and their combination, skip connections, up-sampling and down-sampling blocks, and so forth.

All variations are subject to a synthesis model where the main goal is to synthesize acoustic features for vocoding from acoustic features, linguistic features, style features, or other kind of features.

Data

For PPG. Medium-quality voice data of various accents with the presence of texts are available in datasets of LibriSpeech and CommonVoice. The texts can be normalized and processed to obtain phoneme sequences according to ARPAbet phoneme set. Next, the procedure of alignment (align) of phonemes in time can be performed using the Montreal-Forced-Aligner utility. The image of texts can be processed by grapheme-to-phoneme (g2p) to obtain phonemes. Then, the phonemes can be processed and aligned together with audio signal.

For the vocoder. The VCTK dataset is used for pre-training and, similar to the data for synthesis, pure data from the speakers that were not used to train the synthesis model. These data are resynthesized to melspectrograms. The melspectrograms can then be used together with the original pure audio to retrain the vocoder.

Training

In some embodiments, the PPG model is trained in two stages: pre-training and additional training. A set of augmentations, such as noise and SpecAugment can be used in both stages.

Pre-training of the PPG model can be performed in an unsupervised manner using clustering. Specifically, Mel-frequency cepstral coefficients (Mfcc) or hidden features of large ASR neural networks can be algorithmically divided into clusters using k-means. Each frame can be assigned to a specific cluster (by a number). Pre-training includes training the PPG model with a classification head to obtain the number of the cluster for a frame. The last hidden layer of features of the PPG model can be clustered (like Mfcc) and used for training an improved PPG model. This procedure can be applied iteratively.

Additional training of the PPG model is carried out on connectionist temporal classification loss (recognition task) by phoneme sequence and cross-entropy loss (classification task) by phoneme prediction in each frame. To do this, two appropriate heads can be used on top of the encoder in the PPG model. As described in FIG. 7, additional training of a PPG model can be performed using loss for accent reduction. In these embodiments, the training can be performed by providing output of one of intermediate blocks of the PPG model to an accent discriminator with reversal gradient using accent classification loss function, which may play the role of accent loss function (see blocks 704 and 706 in FIG. 7).

The synthesis model can be trained on predictions of acoustic values in predictors of values of the output melspectrogram after the decoder and after the post-network. The predictors may include mean squared error (mse) loss according to energy and f0 predictions and binary cross entropy loss according to VAD prediction. For the synthesis model, output speaker embeddings can be trained as parameters that lead to a fixed number of available output speaker embeddings. In other embodiments, the output speaker embeddings can be obtained as hidden features of a pre-trained speaker classification model applied in a streaming manner to input speech data in order to perceive input speaker voice.

Vocoder can be trained in two stages: training on a large multiple speaker dataset and additional training on resynthesis with the help of the already trained part of the pipeline 300. The optimization methods (training methods) can be combined to train described models jointly. During joint training, a single audio sample can be used for every loss function calculation and every parameter update.

Streaming

Figure 9:
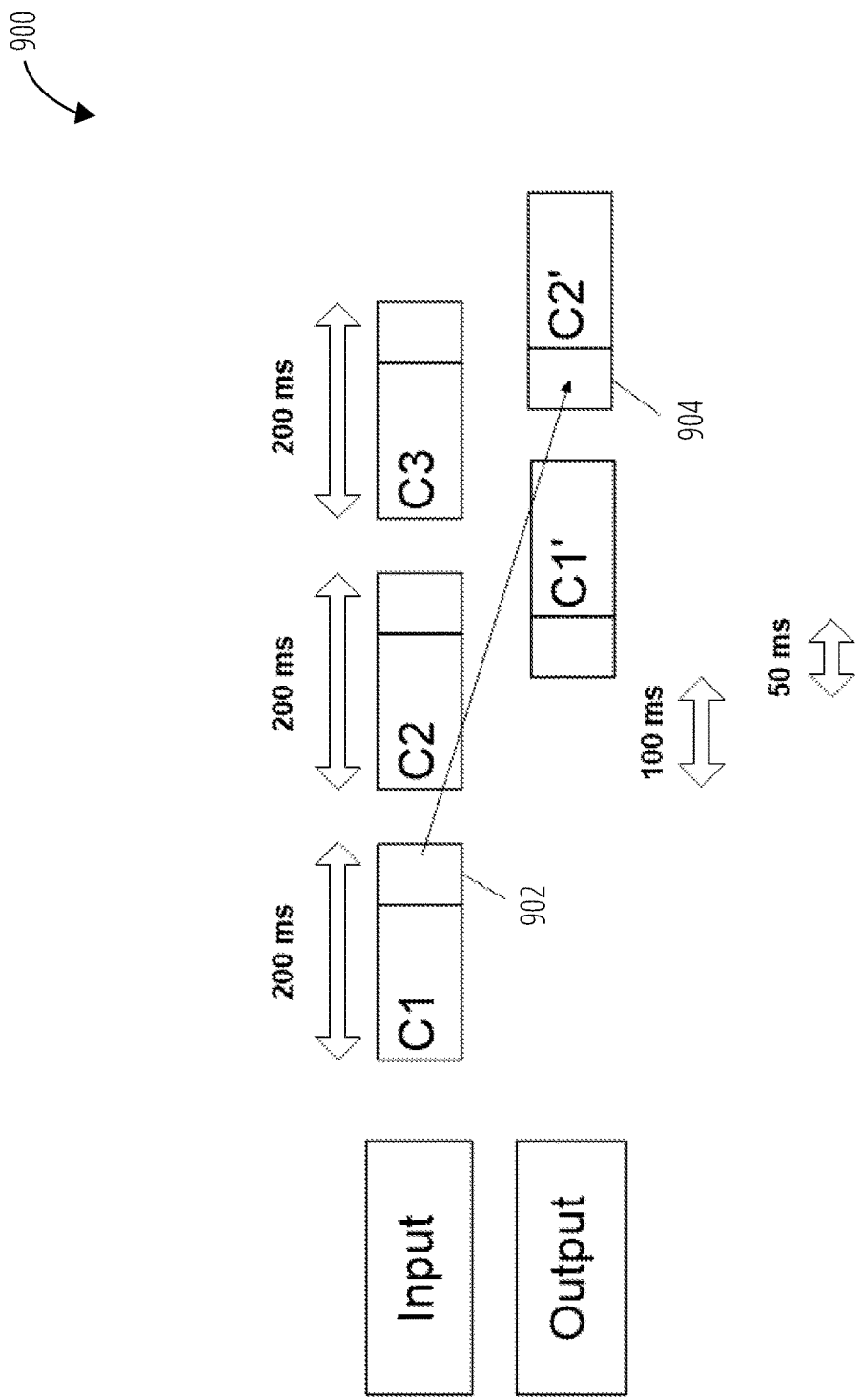
FIG. 9 is a schematic showing details of streaming of an input audio signal, according to some example embodiment.

FIG. 9 is a schematic showing details of streaming of an input audio signal, according to some example embodiment.

The input audio signal can be processed in chunks. A chunk may correspond to a certain window, typically, 3~10 frames=3*256~10*256 samples=35~116 ms. Each module in pipeline 300 processes the chunk and outputs a result corresponding to the size of the input chunk.

In accordance with architectures of modules (feature extraction, synthesis, vocoding), an appropriate number of frames/samples can be cut off (modularly or at the output) to obtain a high-quality result with a low latency. The number of frames/samples can be defined as the total number of frames/samples from the front of the signal.

The streaming delay can be defined as the time difference between the original moment of speech and the output corresponding to the original one. The streaming delay includes the following components:

Architectural delay. This delay is embedded in the indentation to account for a larger future context and thereby improving the processing quality of each module in the pipeline.

The size of the chunk. The size of the chunk affects time for waiting for all the data before processing because the modules cannot output the result until the data are obtained by the modules.

Processing time. The processing time is a time within which the chunk is completely processed by modules in the pipeline 300. The processing time needed to be adjusted to ensure a stable conversion of input chunks into output chunks.

In the example of FIG. 9, the size of the chunk is 200 ms, maximum processing time is 100 ms, and the architecture delay is 50 ms. The total delay is 350 ms. The chunks C1, C2, C3, . . . are fed into the pipeline 300 in real time. Each output chunk C1', C2', . . . corresponds to only one of the input chunk C1, C2, C3, . . . . Portion 904 of output audio signal 308 corresponds to portion 902 of input audio signal 202. Portion 902 and portion 904 correspond to the same moment of the speech of the user 102. Overall, according to experiments conducted by the inventors, the methods of the present disclosure allow to achieve the total delay of 40-300 ms.

Figure 10:
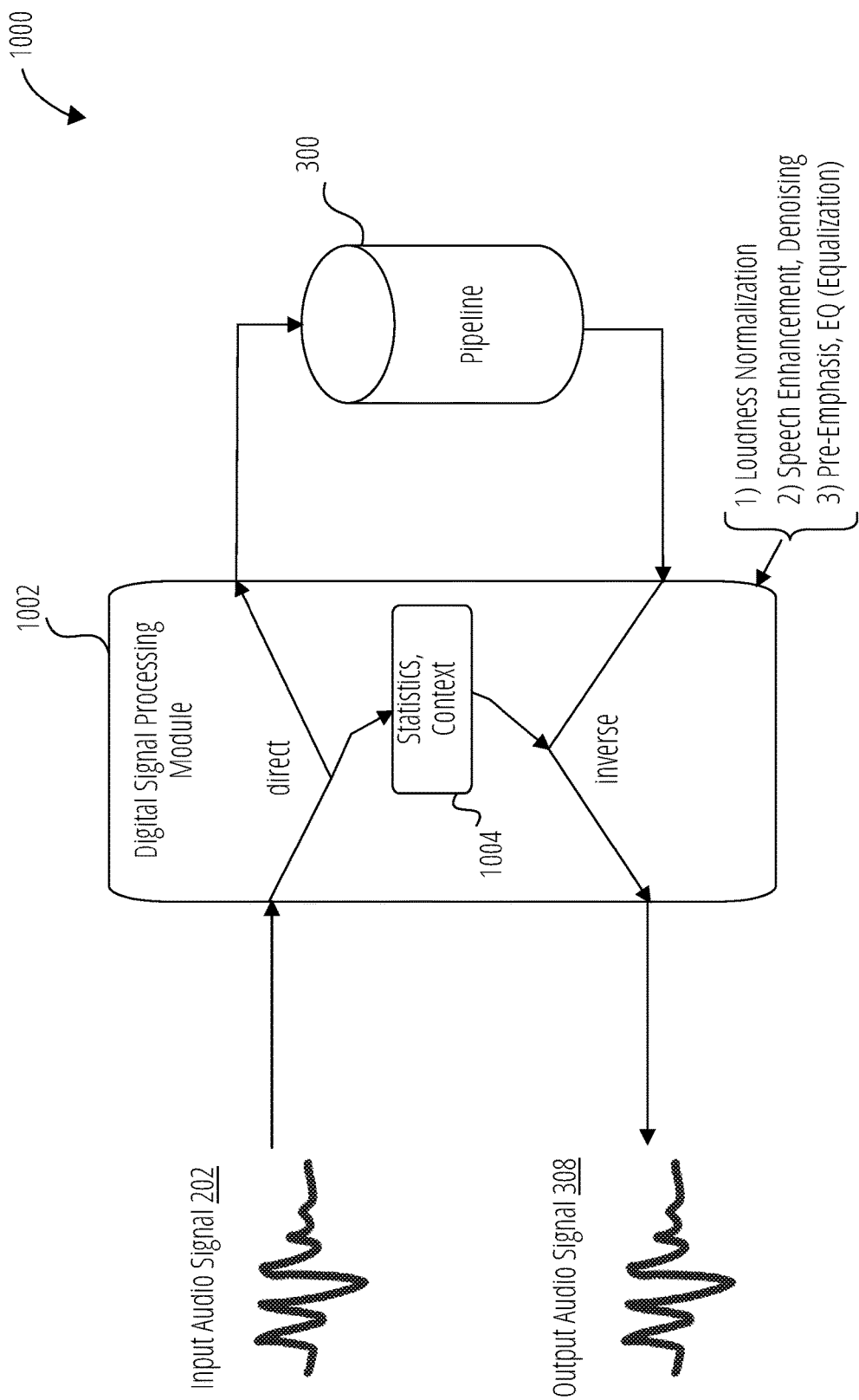
FIG. 10 is a block diagram showing a digital signal processing module for use with a system for real-time correction of accent in input audio signals, according to some example embodiments.

FIG. 10 is a block diagram 1000 showing a digital signal processing module 1002 for use with pipeline 300 for real-time correction of accent in input audio signals, according to some example embodiments. The digital signal processing module 1002 can be used for enhancement of input audio signal 202 and output audio signal 308. The digital signal processing module 1002 may include submodule 1004 for collecting and storing statistics and context during processing input audio signal 202. The processed input audio signal 202 can be further provided to pipeline 300 for correction of accent. The output of the pipeline 300 can be processed by digital signal processing module 1002 to obtain an output audio signal 308. During processing of the output of pipeline 300, the digital signal processing module 1002 can utilize statistics and context collected by submodule 1004 to restore some characteristics removed from the input audio signal.

In some embodiments, digital signal processing module 1002 may process input audio signal 202 to remove or attenuate noise, cancel echo, and remove other artifacts. Digital signal processing module 1002 may also perform normalization of loudness of the signal, equalizing the signal, applying a pre-emphasis or de-emphasis to the signal, and enhancing a speech in the signal. In certain embodiments, digital signal processing module 1002 can be integrated in one of the modules of the pipeline 300 as a beginning submodule or inserted between any two modules of the pipeline 300. In these embodiments, digital signal processing module 1002 can be trained with corresponding losses to imitate digital signal processing algorithms.

In some embodiments, digital signal processing module 1002 can be used to control loudness of output audio signal 308. For example, digital signal processing module 1002 may auto-gain loudness of input audio signal 202 before pipeline 300 processing and then, based on a user setting, restore or not restore level of loudness of output audio signal 308 to corresponding level of loudness of input audio signal 202.

Figure 11:
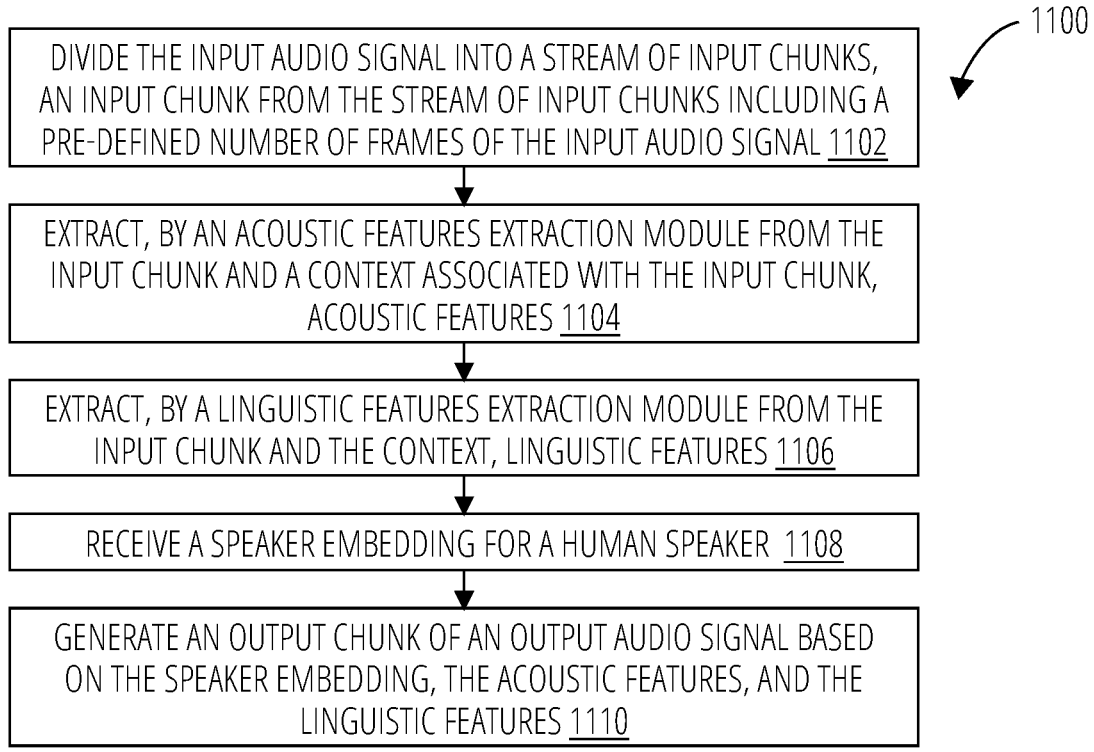
FIG. 11 is a flow chart showing a method for real-time correction of accent in input audio signals, according to some example embodiments.

FIG. 11 is a flow chart showing a method 1100 for real-time correction of accent in input audio signals, according to some example embodiments. In some embodiments, the operations of method 1100 may be combined, performed in parallel, or performed in a different order. Method 1100 may also include additional or fewer operations than those illustrated. The method 1100 may be performed by processing logic that comprises hardware (e.g., decision making logic, dedicated logic, programmable logic, and microcode), software (such as software run on a general-purpose computer system or a dedicated machine), or a combination of both.

In block 1102, method 1100 may divide the input audio signal into a stream of input chunks, an input chunk from the stream of input chunks including a pre-defined number of frames of the input audio signal. The input audio signal can be recorded, via an acoustic sensor, from the voice of a user by a computing device implementing method 1100.

In block 1104, method 1100 may extract, by an acoustic features extraction module, acoustic features from the input chunk and a context associated with the input chunk. The context may include a pre-determined number of the frames belonging to chunks preceding the input chunk in the stream of input chunks. The acoustic features may include a pitch of the input audio signal, an energy of the input audio signal, and a value of a voice activity detector. The voice activity detector may indicate absence of a human voice in the input audio signal or presence of the human voice in the input audio signal.

In block 1106, method 1100 may extract, by a linguistic features extraction module from the input chunk and the context, linguistic features with a reduced accent or accent-agnostic linguistic features. The linguistic features extraction module may include a neural network trained based on audio data to output the linguistic features and using a loss function to reduce, in the linguistic features, contributions due to a further accent present in the audio data. The linguistic features may include one of the following: phonetic posteriorgrams or phonetic posteriorgrams with a data-driven phonetic library.

In block 1108, method 1100 may receive a speaker embedding for a human speaker. The speaker embedding can be pretrained based on audio data including a recorded speech of a target speaker having a further accent. Alternatively, the speaker embedding can be generated based on the input audio signal in real-time.

In block 1110, method 1100 may generate an output chunk of an output audio signal based on the speaker information (for example, speaker embedding), the acoustic features, and the linguistic features. For example, method 1100 may provide the speaker embedding, the acoustic features, and the linguistic features to a synthesis module to generate a melspectrogram with the reduced accent. The synthesis module may include an encoder, a decoder, and a post-net module designed to improve the output of the decoder. Generating the melspectrogram may include processing the linguistic features by the encoder to generate hidden features; combining the hidden features, the acoustic features, and the speaker embeddings to generate further features; and processing the further features by the decoder and the post-net module to generate the melspectrogram.

After generating the melspectrogram, method 1100 may provide the melspectrogram to a vocoder to generate an output chunk of an output audio signal. A delay between the first timestamp corresponding to the time when the chunk of the input audio signal is recorded and the second timestamp corresponding to the time when the output chunk is generated can be between 40 ms and 300 ms.

The acoustic features can be split into a stream of acoustic features chunks corresponding to the chunks in the stream of input chunks. The linguistic features can be split into a stream of linguistic features chunks corresponding to the chunks in the stream of input chunks. The melspectrogram can be split into a stream of melspectrogram chunks corresponding to the chunks in the stream of input chunks. A melspectrogram chunk of the stream of melspectrogram chunks is generated based on the following:

an acoustic features chunk of the stream of acoustic features chunks and acoustic features context including the pre-determined number of acoustic features frames belonging to acoustic features chunks preceding the acoustic features chunk in the stream of acoustic features chunks; and a linguistic features chunk of the stream of melspectrogram chunks and linguistic features context including the pre-determined number of linguistic features frames belonging to linguistic features chunks preceding the linguistic features chunk in the stream of acoustic features chunks.

The method 1100 may include, prior to dividing the input audio signal, processing the input audio signal by a digital signal processing module to adjust one or more characteristics of the input audio signal to improve extraction of the linguistic features and the acoustic features.

The method 1100 may include, prior to dividing the input audio signal, processing the input audio signal by a digital signal processing module to adjust a loudness of the input audio signal from a first level to a second level. Method 1100 may include, after generating the output chunk of the output audio signal, processing the output chunk by the digital signal processing module to adjust the loudness of the output audio signal to the first level.

Figure 12:
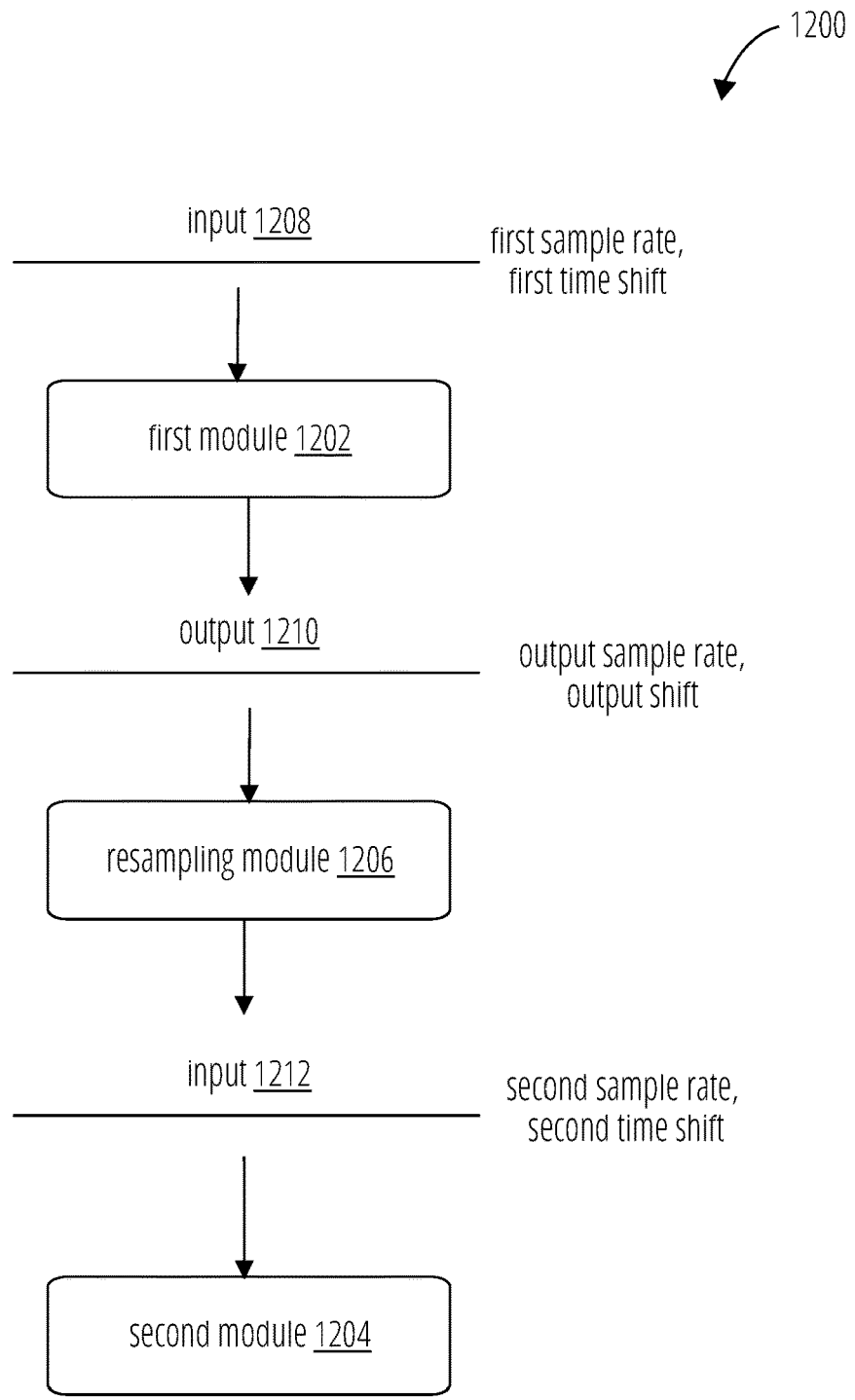
FIG. 12 is a schematic showing details of processing a stream of features by modules of pipeline, according to some example embodiments.

FIG. 12 is schematic 1200 showing details of processing a stream of features by modules of pipeline 300, according to some example embodiments. FIG. 12 shows the first module 1202 and the second module 1204. The first module 1202 and second module 1204 can be any two successive modules in pipeline 300 (computational graph) shown in FIG. 3. The first module 1202 and second module 1204 can also include two successive internal blocks within one of the modules in pipeline 300 (computational graph) shown in FIG. 3.

Generally, input audio signal 202 and output audio signal 308 (shown in FIG. 3) can be represented using different sample rates. In some embodiments, input audio signal 202 may have 24 kHz as a sample rate and output audio signal 308 may have 16 kHz as a sample rate. Similarly, all modules and blocks in pipeline 300 (computational graph) may have inputs and outputs of different sample rates and different time size for a frame of input feature. In example of FIG. 12, input 1208 of the first module 1202 may have a first sample rate and input 1212 of second module 1204 succeeding the first module 1202 in the computational graph may have a second sample rate. The output 1210 of the first module 1202 may have an output sample rate different from both the first sample rate of input 1208 of the first module 1202 and input 1212 of the second module 1204. For example, vocoder 306 (shown in FIG. 3) may use input features of single frame time equal to 256/22050 ms to produce 256 times more samples of single sample time period equal to 1/22050 ms.

Transferring features between first module 1202 and second module 1204 can be performed in accordance with input feature characteristics for second module 1204. Output 1210, that is the stream of features generated by the first module 1202, can be resampled and cached by resampling module 1206 to accumulate input 1212 of the second module 1204 with accordance with the second sample rate and required size of input, including a cache for a content. Resampling can be performed when the time period or sample number of output of first module 1202 mismatch a corresponding input of the second module 1204. Caching of last acquired frames or samples can be used to make the transform of previous chunks and frames of features continuous in time, without breaks and discontinuity. If input and output of adjacent modules or blocks in pipeline 300 match each other, then resampling is not needed.

Each module (block or node of computational graph) of pipeline 300 may be assigned its own format for inputs and outputs. For streaming purposes, "shift" attribute can be utilized. The "shift" attribute may describe mismatching between input and output. For example, if output 1210 of timestamp (T) ms can be only produced by input 1208 of timestamp (T+s) ms, then (s) is shift (or effective shift) for the input 1208. Every input and output in pipeline 300 may have its own shift value. Output feature shift can be calculated by shifts of inputs and a shift caused by the module structure itself, since modules have a shift when processing the input into output. In order to produce the most effective and qualitative system, the pipeline 300 (computational graph) can be implemented with matching shifts and other characteristics for inputs and outputs of corresponding adjacent blocks.

Each module (or block) may define only relative value for inputs/outputs shifts. Thus, inputs of modules can be provided with such relative differences. Output shifts can be obtained by addition to the input shift of a processing time of module.

For example, if input feature shift is 20 ms and module has an additional shift of 100 ms in its processing, then output has a shift of 120 ms. In one example embodiment, a module is defined to have a zero-shifted input feature and processes output A with additional shift of 100 ms, and output B with additional shift 50 ms. Then output A has the shift of 130 ms and output B has a shift of 80 ms. In another example embodiment, the module has input A with shift of 50 ms, input B with shift of 100 ms and output C shift of 200 ms, and inputs A and B are provided from previous processing with shifts 1000 ms and 1050 ms. Then the module returns output C with resulting shift 1150 ms. In yet another example embodiment, inputs A and B are provided from previous processing with shifts that differ from each other by more or less than 50 ms. Then it indicates that the pipeline is incorrectly configured.

In general, the module has inputs I_1 (shift=t_i1), ..., I_n (shift=t_in) and produces outputs O_1 (shift=t_o1), ..., O_n (shift=t_on) (MUST be max(t_i)<=min(t_o)), inputs provided for processing (with shifts T_ik) are correct if T_ik−t_ik=same const for all k. Outputs returned by the module may have shifts, for output k: T_ok=t_ok+(T−t_i1).

The shifts can be selected to find a trade-off for quality of output feature vs provided delay. Higher shift values (for example, 100 ms) can be selected for linguistic features and lower shift values can be selected for acoustic features (for example, 20 ms) and input for vocoding (for example, 40 ms).

Figure 13:
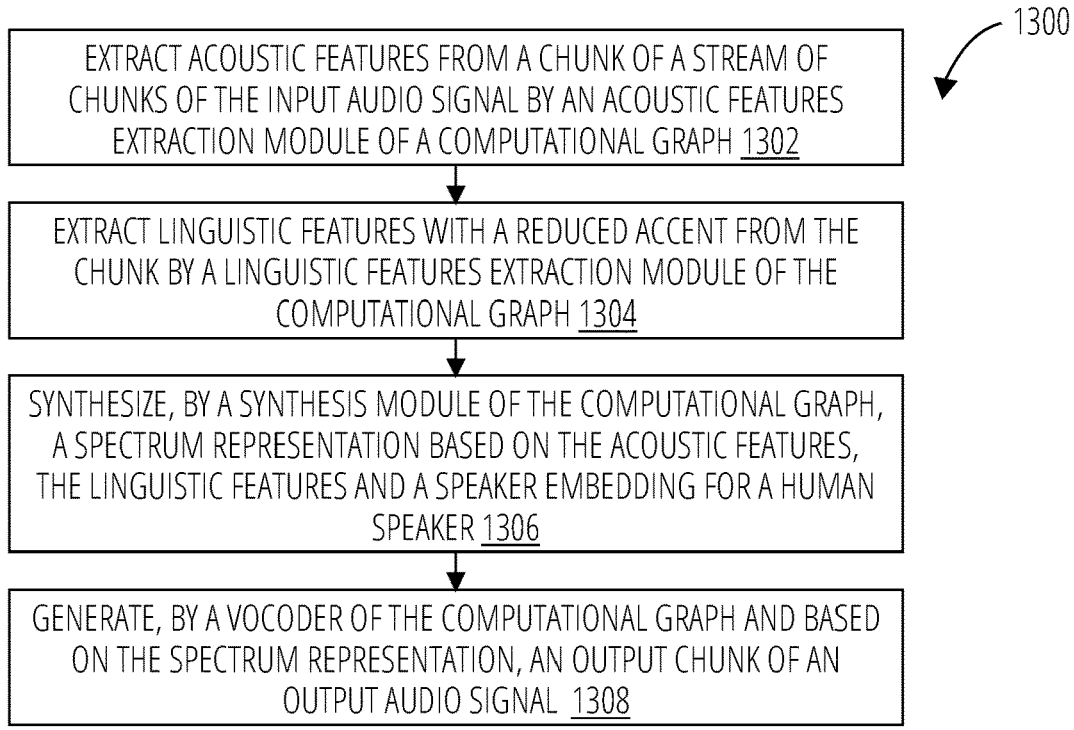
FIG. 13 illustrates a method for real-time correction of accent in input audio signals in accordance with some embodiments.

FIG. 13 illustrates a method 1300 for real-time correction of accent in input audio signals in accordance with some embodiments. The method 1300 can be implemented by a computer system. In some embodiments, the operations of method 1300 may be combined, performed in parallel, or performed in a different order. Method 1300 may also include additional or fewer operations than those illustrated. The method 1300 may be performed by processing logic that comprises hardware (e.g., decision making logic, dedicated logic, programmable logic, and microcode), software (such as software run on a general-purpose computer system or a dedicated machine), or a combination of both.

In block 1302, method 1300 may include extracting acoustic features from a chunk of a stream of chunks of the input audio signal by an acoustic features extraction module of a computational graph. The acoustic features may include one or more of the following: a pitch of the input audio signal, a standard deviation of the pitch of the input audio signal, a mean of the pitch of the input audio signal, an energy of the input audio signal, a noise floor of the input audio signal, LPCC of the input audio signal, MFCC of the input audio signal, BFCC of the input audio signal, and custom linear transform of STFT values of audio signal.

In block 1304, method 1300 may include extracting linguistic features with a reduced accent from the chunk by a linguistic features extraction module of the computational graph.

In block 1306, method 1300 may include synthesizing, by a synthesis module of the computational graph, a spectrum representation based on the acoustic features, the linguistic features, and a speaker embedding for a human speaker.

In block 1308, method 1300 may include generating, by a vocoder of the computational graph and based on the spectrum representation, an output chunk of an output audio signal. The spectrum representation may include a melspectrogram with the reduced accent. The input audio signal can be digitized with a first sample rate and the output audio signal can be digitized with a second sample rate different from the first sample rate.

In some embodiments, input data of a first module of the computational graph may have a first sample rate and output data of a second module preceding the first module in the computational graph may have a second sample rate different from the first sample rate. In these embodiments, method 1300 may include resampling the output data from the second sample rate to the first sample rate and providing the resampled output data and at least one characteristic of the resampled output data to the first module as the input data.

In some embodiments, the computing system implementing method 1300 may include at least two processing units, such that at least two modules from the computational graph can be processed in parallel using the two processing units.

In some embodiments, method 1300 may include providing, as an input to at least one module in the computational graph, a time-shift parameter indicating a difference in timestamps of the chunk of a stream of chunks of the input audio signal and one of the following: input data or output data of the at least one module. Method 1300 may include assigning a further time-shift parameter to output data of at least one module. The further time-shift parameter may include the time-shift parameter and internal delay of processing the input data by at least one module. Method 1300 may include providing the further time-shift parameter and the output data as a further input to a further module succeeding the at least one module in the computational graph. In certain embodiments, the acoustic features can be assigned a lower time-shift parameter than the linguistic features.

Figure 14:
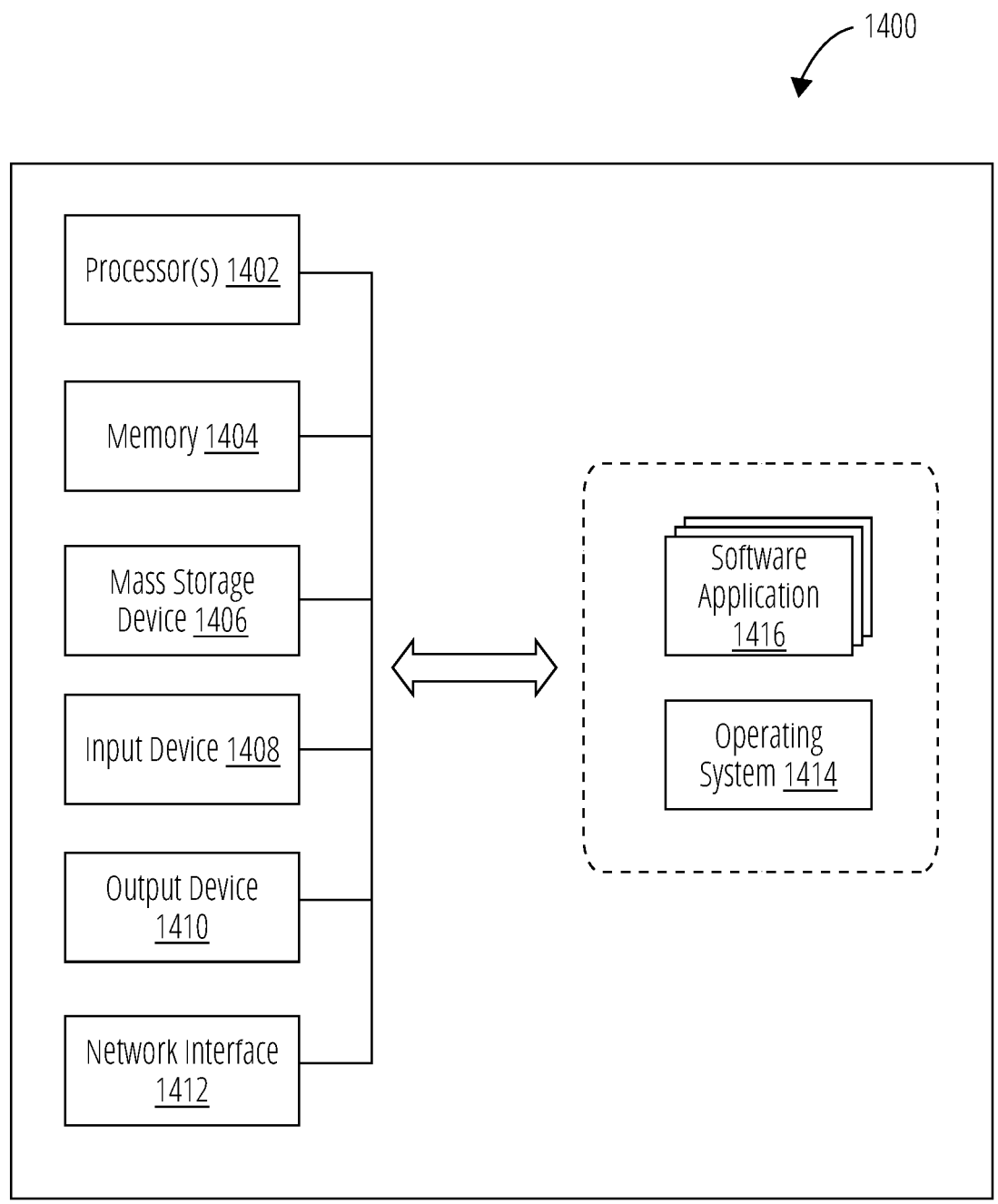
FIG. 14 is a high-level block diagram illustrating an example computer system, within which a set of instructions for causing the machine to perform any one or more of the methodologies discussed herein can be executed.

FIG. 14 is a high-level block diagram illustrating an example computer system 1400, within which a set of instructions for causing the machine to perform any one or more of the methodologies discussed herein can be executed. The computer system 1400 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 1400 is an example of computing devices 106, computing device 110, and computing cloud 112 shown in FIG. 1. Notably, FIG. 14 illustrates just one example of the computer system 1400 and, in some embodiments, the computer system 1400 may have fewer elements/modules than shown in FIG. 14 or more elements/modules than shown in FIG. 14.

The computer system 1400 may include one or more processor(s) 1402, a memory 1404, one or more mass storage devices 1406, one or more input devices 1408, one or more output devices 1410, and a network interface 1412. The processor(s) 1402 are, in some examples, configured to implement functionality and/or process instructions for execution within the computer system 1400. For example, the processor(s) 1402 may process instructions stored in the memory 1404 and/or instructions stored on the mass storage devices 1406. Such instructions may include components of an operating system 1414 or software applications 1416. The computer system 1400 may also include one or more additional components not shown in FIG. 14, such as a body, a power supply, a power supply, a global positioning system (GPS) receiver, and so forth.

Memory 1404, according to one example, is configured to store information within the computer system 1400 during operation. The memory 1404, in some example embodiments, may refer to a non-transitory computer-readable storage medium or a computer-readable storage device. In some examples, memory 1404 is a temporary memory, meaning that a primary purpose of the memory 1404 may not be long-term storage. Memory 1404 may also refer to a volatile memory, meaning that memory 1404 does not maintain stored contents when the memory 1404 is not receiving power. Examples of volatile memories include random access memories (RAM), dynamic random access memories (DRAM), static random access memories (SRAM), and other forms of volatile memories known in the art. In some examples, memory 1404 is used to store program instructions for execution by the processor(s) 1402. The memory 1404, in one example, is used by software (e.g., the operating system 1414 or the software applications 1416). Generally, the software applications 1416 refer to software Applications suitable for implementing at least some operations of the methods for real-time correction of accent in input audio signals as described herein.

The mass storage devices 1406 may include one or more transitory or non-transitory computer-readable storage media and/or computer-readable storage devices. In some embodiments, the mass storage devices 1406 may be configured to store greater amounts of information than the memory 1404. The mass storage devices 1406 may further be configured for long-term storage of information. In some examples, the mass storage devices 1406 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Input devices 1408, in some examples, may be configured to receive input from a user through tactile, audio, video, or biometric channels. Examples of the input devices 1408 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1400, or components thereof.

The output devices 1410, in some examples, may be configured to provide output to a user through visual or auditory channels. The output devices 1410 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1410 may also include a touchscreen, a presence-sensitive display, or other input/output capable displays known in art.

The network interface 1412 of the computer system 1400, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 1412 may be a network interface card, such as an Ethernet card, an optical transceiver, a radio frequency transceiver, or any other type of device that can send and receive information.

The operating system 1414 may control one or more functionalities of the computer system 1400 and/or components thereof. For example, operating system 1414 may interact with the software applications 1416 and may facilitate one or more interactions between the software applications 1416 and components of the computer system 1400. As shown in FIG. 14, the operating system 1414 may interact with or be otherwise coupled to the software applications 1416 and components thereof. In some embodiments, the software applications 1416 may be included in the operating system 1414. In these and other examples, virtual modules, firmware, or software may be part of software applications 1416.

Thus, systems and methods for real-time correction of accent in input audio signals have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method for real-time accent correction, the method implemented by a computing system and comprising:
    extracting, from a chunk of a stream of chunks of an input audio signal, acoustic features and linguistic features, wherein the linguistic features have a reduced accent;
    synthesizing a spectrum representation based on the acoustic features, the linguistic features, and a speaker embedding for a human speaker; and
    generating, by a vocoder and based on the spectrum representation, an output chunk of an output audio signal.

2. The method of claim 1, wherein:
    the spectrum representation includes a melspectrogram with the reduced accent; and
    the acoustic features include one or more of a pitch of the input audio signal, a standard deviation of the pitch of the input audio signal, a mean of the pitch of the input audio signal, an energy of the input audio signal, a noise floor of the input audio signal, Linear Prediction Cepstral Coefficients (LPCC) of the input audio signal, Mel Frequency Cepstral Coefficients (MFCC) of the input audio signal, or Bark Frequency Cepstral coefficients (BFCC) of the input audio signal.

3. The method of claim 1, wherein:
the input audio signal is digitized with a first sample rate; and
the output audio signal is digitized with a second sample rate different from the first sample rate.

4. The method of claim 1, further comprising processing, in parallel via at least two processing units of the computing system, two or more of the extracting the acoustic features, extracting the linguistic features, synthesizing the spectrum representation, or generating the output chunk.

5. The method of claim 1, further comprising:
extracting the acoustic features, extracting the linguistic features, synthesizing the spectrum representation, and generating the output chunk using respective modules of a computational graph, wherein each of the respective modules is associated with input data and output data; and
providing, as an input to at least one of the modules, a time-shift parameter indicating a difference in timestamps of the chunk of the stream of chunks of the input audio signal and one of the input data or the output data of the at least one of the respective modules, wherein the acoustic features are assigned a lower time-shift parameter than the linguistic features.

6. A computing system, comprising an input device, a vocoder, memory comprising instructions stored thereon, and one or more processors coupled to the memory and configured to execute the stored instructions to:
extract, from a chunk of a stream of chunks of an input audio signal obtained via the input device, acoustic features and linguistic features, wherein the linguistic features have a reduced accent;
synthesize a spectrum representation based on the acoustic features, the linguistic features, and a speaker embedding for a human speaker; and
generate, via the vocoder and based on the spectrum representation, an output chunk of an output audio signal.

7. The computing system for real-time correction of claim 6, wherein:
the spectrum representation includes a melspectrogram with the reduced accent; and
the acoustic features include one or more of a pitch of the input audio signal, a standard deviation of the pitch of the input audio signal, a mean of the pitch of the input audio signal, an energy of the input audio signal, a noise floor of the input audio signal, Linear Prediction Cepstral Coefficients (LPCC) of the input audio signal, Mel Frequency Cepstral Coefficients (MFCC) of the input audio signal, or Bark Frequency Cepstral coefficients (BFCC) of the input audio signal.

8. The computing system for real-time correction of claim 6, wherein:
the input audio signal is digitized with a first sample rate; and
the output audio signal is digitized with a second sample rate different from the first sample rate.

9. The computing system for real-time correction of claim 6, wherein the processors are further configured to execute the stored instructions to process, in parallel, two or more of the extracting the acoustic features, extracting the linguistic features, synthesizing the spectrum representation, or generating the output chunk.

10. The computing system for real-time correction of claim 6, wherein the processors are further configured to execute the stored instructions to:
extract the acoustic features, extract the linguistic features, synthesize the spectrum representation, and generate the output chunk using respective modules of a computational graph, wherein each of the respective modules is associated with input data and output data; and
provide, as an input to at least one of the respective modules, a time-shift parameter indicating a difference in timestamps of the chunk of the stream of chunks of the input audio signal and one of the input data or the output data of the at least one of the respective modules, wherein the acoustic features are assigned a lower time-shift parameter than the linguistic features.

11. A non-transitory computer-readable storage medium comprising instructions stored thereon that, when executed by one or more processors, cause the processors to:
extract, from a chunk of a stream of chunks of an input audio signal, linguistic features and acoustic features, wherein the linguistic features have a reduced accent;
synthesize a spectrum representation based on the acoustic features, the linguistic features, and a speaker embedding for a human speaker;
generate, by a vocoder and based on the spectrum representation, an output chunk of an output audio signal; and
provide the output audio signal for output via an auditory channel of an output device.

12. The non-transitory computer-readable storage medium of claim 11, wherein:
the spectrum representation includes a melspectrogram with the reduced accent; and
the acoustic features include one or more of a pitch of the input audio signal, a standard deviation of the pitch of the input audio signal, a mean of the pitch of the input audio signal, an energy of the input audio signal, a noise floor of the input audio signal, Linear Prediction Cepstral Coefficients (LPCC) of the input audio signal, Mel Frequency Cepstral Coefficients (MFCC) of the input audio signal, or Bark Frequency Cepstral coefficients (BFCC) of the input audio signal.

13. The non-transitory computer-readable storage medium of claim 11, wherein:
the input audio signal is digitized with a first sample rate; and
the output audio signal is digitized with a second sample rate different from the first sample rate.

14. The non-transitory computer-readable storage medium of claim 11, wherein the instructions, when executed by the processors, further cause the processors to process, in parallel, two or more of the extracting the acoustic features, extracting the linguistic features, synthesizing the spectrum representation, or generating the output chunk.

15. The non-transitory computer-readable storage medium of claim 11, wherein the instructions, when executed by the processors, further cause the processors to:
extract the acoustic features, extract the linguistic features, synthesize the spectrum representation, and generate the output chunk using respective modules of a computational graph, wherein each of the respective modules is associated with input data and output data; and
provide, as an input to at least one of the respective modules, a time-shift parameter indicating a difference in timestamps of the chunk of the stream of chunks of the input audio signal and one of the input data or the output data of the at least one of the respective modules, wherein the acoustic features are assigned a lower time-shift parameter than the linguistic features.

16. A method for real-time accent correction, the method implemented by a computing system and comprising:
    dividing a speech audio signal into a stream of input chunks, an input chunk from the stream of input chunks including a pre-defined number of frames of the speech audio signal;
    extracting, from the input chunk and a context associated with the input chunk, acoustic features and linguistic features, wherein the linguistic features have a reduced accent;
    obtaining a speaker embedding for a human speaker; and
    generating an output chunk of an output audio signal based on the speaker embedding, the acoustic features, and the linguistic features.

17. A computing system, comprising memory comprising instructions stored thereon, and one or more processors coupled to the memory and configured to execute the stored instructions to:
    divide a speech audio signal into a stream of input chunks, an input chunk from the stream of input chunks including a pre-defined number of frames of the speech audio signal;
    extract, from the input chunk and a context associated with the input chunk, acoustic features and linguistic features, wherein the linguistic features have a reduced accent;
    obtain a speaker embedding for a human speaker; and
    generate an output chunk of an output audio signal based on the speaker embedding, the acoustic features, and the linguistic features.

18. A non-transitory computer-readable storage medium comprising instructions stored thereon that, when executed by one or more processors, cause the processors to:
    divide a speech audio signal into a stream of input chunks, an input chunk from the stream of input chunks including a pre-defined number of frames of the speech audio signal;
    extract, from the input chunk and a context associated with the input chunk, acoustic features and linguistic features, wherein the linguistic features have a reduced accent;
    obtain a speaker embedding for a human speaker; and
    generate an output chunk of an output audio signal based on the speaker embedding, the acoustic features, and the linguistic features.

* * * * *